(12) United States Patent
Iwata

(10) Patent No.: US 7,965,989 B2
(45) Date of Patent: *Jun. 21, 2011

(54) HIGH FREQUENCY MODULE

(75) Inventor: Masashi Iwata, Tokyo (JP)

(73) Assignee: TDK Corporation, Tokyo (JP)

( * ) Notice: Subject to any disclaimer, the term of this patent is extended or adjusted under 35 U.S.C. 154(b) by 643 days.

This patent is subject to a terminal disclaimer.

(21) Appl. No.: 12/073,257

(22) Filed: Mar. 3, 2008

(65) Prior Publication Data
US 2008/0238805 A1 Oct. 2, 2008

(30) Foreign Application Priority Data

Mar. 28, 2007 (JP) ................................. 2007-085122

(51) Int. Cl.
*H04B 1/44* (2006.01)
(52) U.S. Cl. ........................................... 455/78; 455/80
(58) Field of Classification Search .................... 455/78, 455/83, 552.1, 553.1, 78.8; 333/129, 132, 333/133

See application file for complete search history.

(56) References Cited

U.S. PATENT DOCUMENTS

| 6,900,705 | B2 | 5/2005 | Nakamura et al. |
| 6,906,411 | B1 | 6/2005 | Katsura et al. |
| 7,176,768 | B2 | 2/2007 | Nakamura et al. |
| 7,224,240 | B2 | 5/2007 | Nakamura et al. |
| 2004/0248539 | A1 | 12/2004 | Furutani et al. |

FOREIGN PATENT DOCUMENTS

| JP | A 2003-142981 | 5/2003 |
| JP | A 2003-338724 | 11/2003 |
| JP | A 2004-364051 | 12/2004 |
| JP | A-2005-260835 | 9/2005 |
| JP | A-2005-303757 | 10/2005 |
| JP | A-2005-311929 | 11/2005 |
| JP | A-2008-017439 | 1/2008 |
| WO | WO 02/01931 A1 | 1/2002 |

OTHER PUBLICATIONS

Iwata M., U.S. Appl. No. 11/723,359, filed Mar. 19, 2007.

*Primary Examiner* — Quochien B Vuong
(74) *Attorney, Agent, or Firm* — Oliff & Berridge, PLC

(57) ABSTRACT

A high frequency module includes a layered substrate and an element for outputting a reception signal in a balanced state. The element includes a first and a second output terminal and is mounted on the top surface of the layered substrate. A first and a second reception signal terminal are disposed on the bottom surface of the layered substrate. The high frequency module further includes a first signal path connecting the first output terminal and the first reception signal terminal to each other, and a second signal path connecting the second output terminal and the second reception signal terminal to each other. The first and second signal paths are each formed using one or more through holes provided inside the layered substrate, and are not exposed at any side surface of the layered substrate.

10 Claims, 16 Drawing Sheets

HIGH FREQUENCY MODULE

BACKGROUND OF THE INVENTION

1. Field of the Invention

The present invention relates to a high frequency module that performs processing of separating a transmission signal and a reception signal from each other.

2. Description of the Related Art

Recently, cellular phones operable in a plurality of frequency bands (multibands) have been put to practical use. It is known that front-end modules for use in cellular phones conforming to the time division multiple access system and operable in a plurality of frequency bands include one in which switching between a transmission signal and a reception signal is performed by a switch circuit. Such a front-end module is called an antenna switch module or a high frequency switch module, for example. In the present patent application a unit composed of a combination of circuits that perform processing of high frequency signals and a substrate for integrating the circuits is called a high frequency module, examples of which include the foregoing front-end module. An example of substrates used in high frequency modules is a layered substrate including a plurality of dielectric layers stacked.

In a front-end module having such a layered substrate, there are cases in which some circuit components are formed using some of conductor layers located inside the layered substrate while one or more elements as one or more other circuit components are mounted on the top surface of the layered substrate. Examples of the one or more elements mounted on the top surface of the layered substrate include a surface acoustic wave (SAW) filter formed of a SAW element and allowing a reception signal to pass. In such a front-end module, there are also cases in which a plurality of external terminals for connection to external circuits are disposed on the bottom surface of the layered substrate. JP 2004-364051A discloses a high frequency module in which a SAW filter is mounted on the top surface of the layered substrate and a plurality of external terminals are disposed on the bottom surface of the layered substrate.

Recently, as disclosed in JP 2003-142981A and JP 2003-338724A, for example, it has also been proposed to use a SAW filter having two output terminals for outputting a balanced signal, as a SAW filter that allows a reception signal to pass, in a front-end module.

In the case where a SAW filter is mounted on the top surface of the layered substrate and a plurality of external terminals are disposed on the bottom surface of the layered substrate in a front-end module, it is necessary to provide one or more signal paths for connecting the SAW filter to the external terminals. As such one or more signal paths for connecting the SAW filter mounted on the top surface of the layered substrate to the external terminals disposed on the bottom surface of the layered substrate, JP 2004-364051A shows in FIG. 5 and FIG. 6 signal paths formed using through holes and conductor layers provided inside the layered substrate and terminal electrodes provided on the side surfaces of the layered substrate. Disadvantageously, however, signal paths having such a configuration are great in length because portions thereof extend to detour around the layered substrate, and consequently insertion losses of the signal paths increase. In addition, such signal paths are susceptible to interference from a circuit outside the module, because portions of the signal paths are located on the side surfaces of the layered substrate.

In the case where a SAW filter having two output terminals for outputting a balanced signal is mounted on the top surface of the layered substrate and two external terminals to be connected to the two output terminals are disposed on the bottom surface of the layered substrate, it is necessary to provide two signal paths for connecting the two output terminals to the two external terminals. Here, the distance between the two external terminals to be connected to the two output terminals of the SAW filter is not always equal to, or rather often different from the distance between the two output terminals of the SAW filter. When the distance between the two external terminals is different from the distance between the two output terminals, the lengths of the two signal paths may also differ accordingly. A difference between the lengths of the two signal paths may cause a reduction in balance of the balanced signal.

OBJECT AND SUMMARY OF THE INVENTION

It is an object of the present invention to provide a high frequency module in which an element for outputting a reception signal in a balanced state is mounted on the top surface of a layered substrate while reception signal terminals are disposed on the bottom surface of the layered substrate, the high frequency module being capable of reducing insertion loss of the path of the reception signal.

A high frequency module of the present invention includes: an antenna terminal connected to an antenna; a first reception signal terminal and a second reception signal terminal for outputting a reception signal in a balanced state; a transmission signal terminal for receiving a transmission signal; a separation circuit disposed between the antenna terminal and the first and second reception and transmission signal terminals, and separating the transmission signal and the reception signal from each other; a balanced signal output element provided between the separation circuit and the first and second reception signal terminals and outputting the reception signal in a balanced state; and a layered substrate for integrating the foregoing components.

The layered substrate includes a plurality of dielectric layers stacked, and has a bottom surface and a top surface located on opposite sides in the direction in which the dielectric layers are stacked, and a plurality of side surfaces coupling the bottom surface and the top surface to each other. The balanced signal output element has a first output terminal and a second output terminal for outputting the reception signal in a balanced state, and is mounted on the top surface of the layered substrate. The bottom surface of the layered substrate has a plurality of sides including one closest to the first and second reception signal terminals. As seen from above the layered substrate, the first and second output terminals of the balanced signal output element are located closest to the one of the plurality of sides of the bottom surface of the layered substrate that is closest to the first and second reception signal terminals.

The high frequency module of the present invention further includes a first signal path connecting the first output terminal and the first reception signal terminal to each other, and a second signal path connecting the second output terminal and the second reception signal terminal to each other. The first and second signal paths are each formed using one or more through holes provided inside the layered substrate, and are not exposed at any side surface of the layered substrate.

By having the above-described configuration, the high frequency module of the present invention makes it possible to reduce the lengths of the first and second signal paths connecting the first and second output terminals of the balanced signal output element disposed on the top surface of the layered substrate to the first and second reception signal terminals disposed on the bottom surface of the layered substrate.

In the high frequency module of the present invention, the balanced signal output element may be a filter formed using an acoustic wave element.

In the high frequency module of the present invention, each of the first and second signal paths may include two through holes disposed such that their respective central axes are offset from each other, and a position-adjusting conductor layer provided inside the layered substrate and connecting the two through holes in series, and the first and second signal paths may be equal in length. In this case, the distance between the first and second reception signal terminals may be different from the distance between the first and second output terminals.

In the high frequency module of the present invention, the layered substrate may further include at least one other through hole in addition to the through holes used to form the first and second signal paths, and the through holes used to form the first and second signal paths may each have a diameter greater than that of the at least one other through hole.

The high frequency module of the present invention may include a plurality of groups of components corresponding to a plurality of pairs of transmission and reception signals in a plurality of different frequency bands, each of the plurality of groups comprising the first and second reception signal terminals, the transmission signal terminal, the balanced signal output element, and the first and second signal paths. In this case, the separation circuit is disposed between the antenna terminal and the first and second reception and transmission signal terminals of the plurality of groups, separates each pair of transmission and reception signals from the other pairs, and separates the transmission signal and the reception signal of each pair from each other.

The first and second reception signal terminals of the plurality of groups may be aligned in a row along the one of the plurality of sides of the bottom surface of the layered substrate that is closest to the first and second reception signal terminals. In this case, the first and second reception signal terminals of the plurality of groups may be aligned in descending order of frequency band. It is preferred that, on the bottom surface of the layered substrate, no other terminal be disposed on an extension of the row of the first and second reception signal terminals of the plurality of groups. Inside the layered substrate, any conductor layer other than conductor layers used to form the first and second signal paths of the plurality of groups is preferably not located in a cross section that passes through the row of the first and second reception signal terminals of the plurality of groups and that is perpendicular to the bottom surface of the layered substrate.

The high frequency module of the present invention makes it possible to reduce the lengths of the first and second signal paths connecting the first and second output terminals of the balanced signal output element disposed on the top surface of the layered substrate to the first and second reception signal terminals disposed on the bottom surface of the layered substrate. Consequently, according to the present invention, it is possible to reduce insertion loss of the path of the reception signal.

Other and further objects, features and advantages of the invention will appear more fully from the following description.

DESCRIPTION OF A PREFERRED EMBODIMENT

A preferred embodiment of the present invention will now be described in detail with reference to the accompanying drawings. A high frequency module of an embodiment of the invention is used as a front-end module in a cellular phone operable in four frequency bands. To be specific, the high frequency module of the embodiment processes a transmission signal and a reception signal of the American Global System for Mobile Communications (AGSM), a transmission signal and a reception signal of the Extended Global System for Mobile Communications (EGSM), a transmission signal and a reception signal of the Digital Cellular System (DCS), and a transmission signal and a reception signal of the Personal Communications Service (PCS).

The frequency band of the transmission signal of the AGSM is 824 to 849 MHz. The frequency band of the reception signal of the AGSM is 869 to 894 MHz. The frequency band of the transmission signal of the EGSM is 880 to 915 MHz. The frequency band of the reception signal of the EGSM is 925 to 960 MHz. The frequency band of the transmission signal of the DCS is 1710 to 1785 MHz. The frequency band of the reception signal of the DCS is 1805 to 1880 MHz. The frequency band of the transmission signal of the PCS is 1850 to 1910 MHz. The frequency band of the reception signal of the PCS is 1930 to 1990 MHz.

Figure 1:
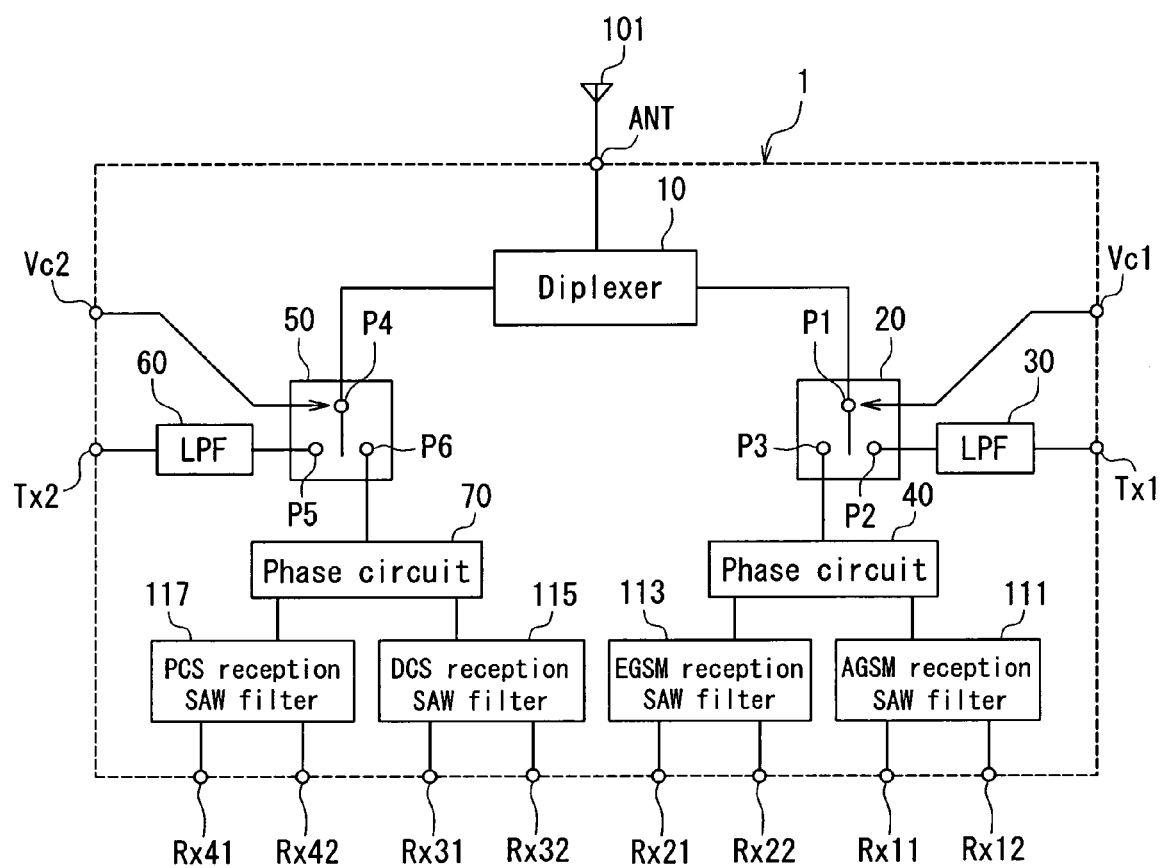
FIG. 1 is a block diagram illustrating the circuit configuration of a high frequency module of an embodiment of the invention.

FIG. 1 is a block diagram illustrating the circuit configuration of the high frequency module of the embodiment. The high frequency module 1 of the embodiment includes: an antenna terminal ANT; two AGSM reception signal terminals Rx11 and Rx12; two EGSM reception signal terminals Rx21 and Rx22; two DCS reception signal terminals Rx31 and Rx32; two PCS reception signal terminals Rx41 and Rx42; transmission signal terminals Tx1 and Tx2; and control terminals Vc1 and Vc2.

The antenna terminal ANT is connected to an antenna 101. The AGSM reception signal terminals Rx11 and Rx12 output an AGSM reception signal in a balanced state. The EGSM reception signal terminals Rx21 and Rx22 output an EGSM reception signal in a balanced state. The DCS reception signal terminals Rx31 and Rx32 output a DCS reception signal in a balanced state. The PCS reception signal terminals Rx41 and Rx42 output a PCS reception signal in a balanced state. The terminals Rx11, Rx21, Rx31 and Rx41 each correspond to the first reception signal terminal of the present invention, while the terminals Rx12, Rx22, Rx32 and Rx42 each correspond to the second reception signal terminal of the present invention.

The transmission signal terminal Tx1 receives an AGSM transmission signal and an EGSM transmission signal. The transmission signal terminal Tx2 receives a DCS transmission signal and a PCS transmission signal. The control terminal Vc1 receives a first control signal. The control terminal Vc2 receives a second control signal.

The terminals ANT, Rx11, Rx12, Rx21, Rx22, Rx31, Rx32, Rx41, Rx42, Tx1, Tx2, Vc1 and Vc2 are adapted to be connected to an external circuit.

The high frequency module 1 further includes a diplexer 10, two switch circuits 20 and 50, two low-pass filters (LPF) 30 and 60, two phase circuits 40 and 70, an AGSM reception SAW filter 111, an EGSM reception SAW filter 113, a DCS reception SAW filter 115, and a PCS reception SAW filter 117. The diplexer 10 is connected to the antenna terminal ANT and the switch circuits 20 and 50.

The switch circuit 20 has three ports P1 to P3. The port P1 is connected to the diplexer 10. The port P2 is connected to the LPF 30. The port P3 is connected to the phase circuit 40. In addition, the switch circuit 20 is connected to the control terminal Vc1. The switch circuit 20 selectively connects the port P2 or P3 to the port P1 in response to the state of the first control signal sent from the control terminal Vc1.

The switch circuit 50 has three ports P4 to P6. The port P4 is connected to the diplexer 10. The port P5 is connected to the LPF 60. The port P6 is connected to the phase circuit 70. In addition, the switch circuit 50 is connected to the control terminal Vc2. The switch circuit 50 selectively connects the port P5 or P6 to the port P4 in response to the state of the second control signal sent from the control terminal Vc2.

The LPF 30 is inserted between the transmission signal terminal Tx1 and the port P2 of the switch circuit 20. The LPF 30 rejects harmonics components included in the AGSM transmission signal and the EGSM transmission signal.

The LPF 60 is inserted between the transmission signal terminal Tx2 and the port P5 of the switch circuit 50. The LPF 60 rejects harmonics components included in the DCS transmission signal and the PCS transmission signal.

The phase circuit 40 is connected to the port P3 of the switch circuit 20, the AGSM reception SAW filter 111 and the EGSM reception SAW filter 113. The phase circuit 40 adjusts the impedance characteristic of the signal path between the port P3 and the SAW filter 111 and that of the signal path between the port P3 and the SAW filter 113 so that an AGSM reception signal from the port P3 is sent to the SAW filter 111 and an EGSM reception signal from the port P3 is sent to the SAW filter 113.

The phase circuit 70 is connected to the port P6 of the switch circuit 50, the DCS reception SAW filter 115 and the PCS reception SAW filter 117. The phase circuit 70 adjusts the impedance characteristic of the signal path between the port P6 and the SAW filter 115 and that of the signal path between the port P6 and the SAW filter 117 so that a DCS reception signal from the port P6 is sent to the SAW filter 115 and a PCS reception signal from the port P6 is sent to the SAW filter 117.

Each of the SAW filters 111, 113, 115 and 117 is a bandpass filter formed using a surface acoustic wave (SAW) element as an acoustic wave element. Alternatively, a filter formed using a bulk acoustic wave element as an acoustic wave element may be provided in place of each of the SAW filters 111, 113, 115 and 117. While the surface acoustic wave element utilizes acoustic waves propagating across the surface of a piezoelectric element (surface acoustic waves), the bulk acoustic wave element utilizes acoustic waves propagating inside a piezoelectric element (bulk acoustic waves).

Each of the SAW filters 111, 113, 115 and 117 has one input for receiving an unbalanced signal and two outputs for outputting a balanced signal. The input of the SAW filter 111 is connected to the phase circuit 40 while the two outputs of the SAW filter 111 are respectively connected to the reception signal terminals Rx11 and Rx12. The input of the SAW filter 113 is connected to the phase circuit 40 while the two outputs of the SAW filter 113 are respectively connected to the reception signal terminals Rx21 and Rx22. The input of the SAW filter 115 is connected to the phase circuit 70 while the two outputs of the SAW filter 115 are respectively connected to the reception signal terminals Rx31 and Rx32. The input of the SAW filter 117 is connected to the phase circuit 70 while the two outputs of the SAW filter 117 are respectively connected to the reception signal terminals Rx41 and Rx42.

The SAW filter 111 allows the AGSM reception signal to pass and intercepts signals at frequencies outside the frequency band of the AGSM reception signal. The SAW filter 113 allows the EGSM reception signal to pass and intercepts signals at frequencies outside the frequency band of the EGSM reception signal. The SAW filter 115 allows the DCS reception signal to pass and intercepts signals at frequencies outside the frequency band of the DCS reception signal. The SAW filter 117 allows the PCS reception signal to pass and intercepts signals at frequencies outside the frequency band of the PCS reception signal. Each of the SAW filters 111, 113, 115 and 117 has a function of converting an unbalanced signal received at the input into a balanced signal and outputting the balanced signal from the outputs.

Figure 2:
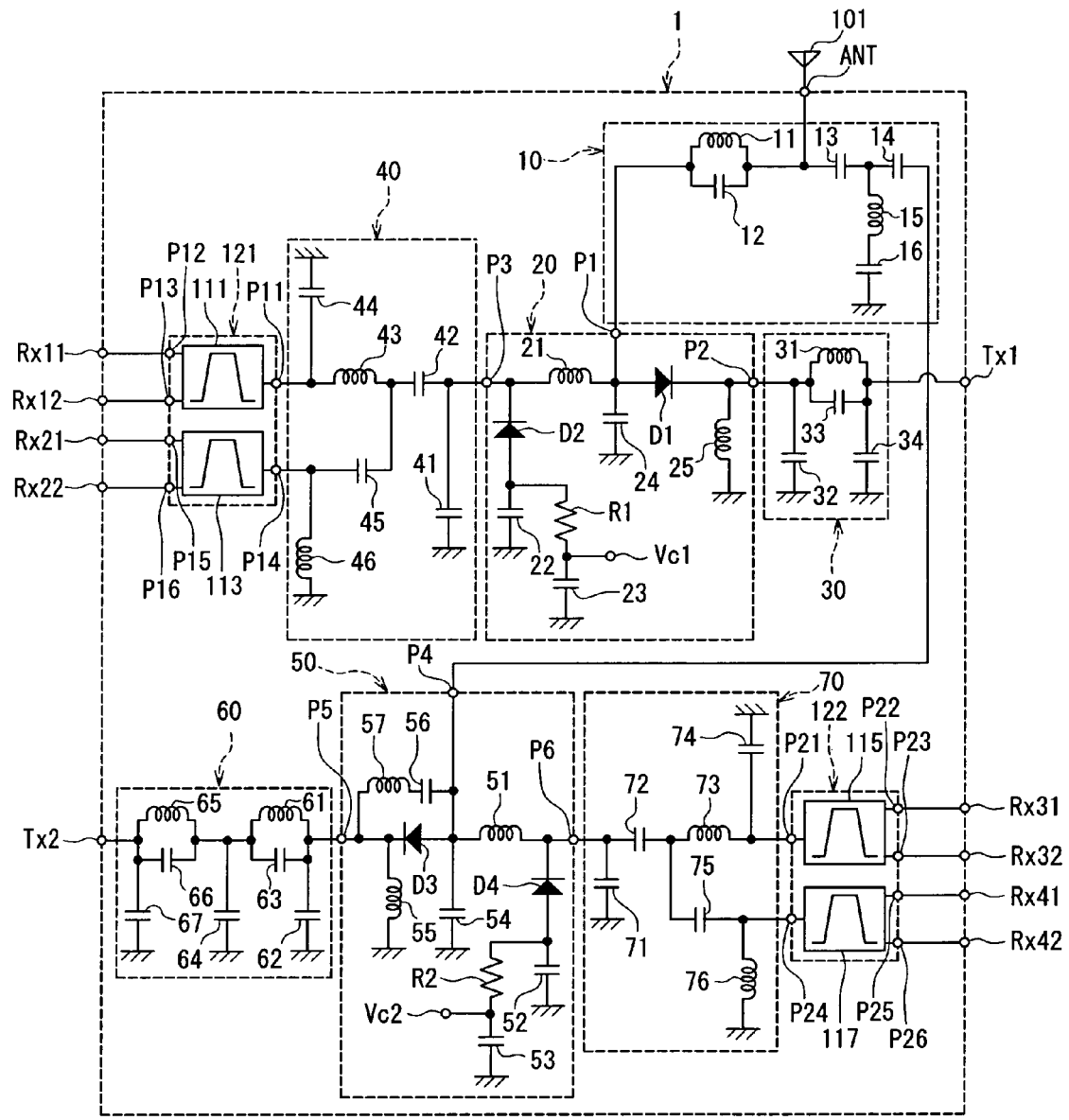
FIG. 2 is a schematic diagram illustrating the circuit configuration of the high frequency module of the embodiment of the invention.

Details of the circuit configuration of the high frequency module 1 of FIG. 1 will now be described with reference to FIG. 2. FIG. 2 is a schematic diagram illustrating the circuit configuration of the high frequency module 1.

The diplexer 10 includes inductors 11 and 15 and capacitors 12, 13, 14 and 16. An end of the inductor 11 and an end of each of the capacitors 12 and 13 are connected to the antenna terminal ANT. The other end of each of the inductor 11 and the capacitor 12 is connected to the port P1 of the switch circuit 20. An end of the capacitor 14 is connected to the other end of the capacitor 13. The other end of the capacitor 14 is connected to the port P4 of the switch circuit 50. An end of the inductor 15 is connected to the other end of the capacitor 13. The other end of the inductor 15 is grounded through the capacitor 16.

The inductor 11 and the capacitor 12 form a low-pass filter that allows the AGSM and EGSM signals to pass and that intercepts the DCS and PCS signals. The capacitors 13, 14 and 16 and the inductor 15 form a band-pass filter that allows the DCS and PCS signals to pass and that intercepts the AGSM and EGSM signals.

The switch circuit 20 includes the ports P1 to P3, inductors 21 and 25, capacitors 22 to 24, a resistor R1, and diodes D1 and D2. The anode of the diode D1 and an end of each of the inductor 21 and the capacitor 24 are connected to the port P1. The other end of the capacitor 24 is grounded. The cathode of the diode D1 and an end of the inductor 25 are connected to the port P2. The other end of the inductor 25 is grounded. The other end of the inductor 21 and the cathode of the diode D2 are connected to the port P3. The anode of the diode D2 is connected to an end of the resistor R1 and grounded through the capacitor 22. The other end of the resistor R1 is connected to the control terminal Vc1 and grounded through the capacitor 23.

The LPF 30 includes an inductor 31 and capacitors 32 to 34. An end of the inductor 31 and an end of each of the capacitors 33 and 34 are connected to the transmission signal terminal Tx1. An end of the capacitor 32 and the other end of each of the inductor 31 and the capacitor 33 are connected to the port P2 of the switch circuit 20. The other end of each of the capacitors 32 and 34 is grounded.

The phase circuit 40 includes capacitors 41, 42, 44 and 45, and inductors 43 and 46. An end of each of the capacitors 41 and 42 is connected to the port P3 of the switch circuit 20. An end of the inductor 43 is connected to the other end of the capacitor 42. The other end of the inductor 43 and an end of the capacitor 44 are connected to the input of the SAW filter 111. The other end of the capacitor 44 is grounded. An end of the capacitor 45 is connected to the other end of the capacitor 42. The other end of the capacitor 45 and an end of the inductor 46 are connected to the input of the SAW filter 113. The other end of the capacitor 46 is grounded.

In this embodiment, the SAW filters 111 and 113 are included in a dual SAW filter 121 that is a single component made up of a combination of the SAW filters 111 and 113. The dual SAW filter 121 has six terminals P11 to P16 and four grounding terminals (not shown). The terminal P11 is connected to the input of the SAW filter 111. The terminals P12 and P13 are respectively connected to the two outputs of the SAW filter 111, and respectively connected to the reception signal terminals Rx11 and Rx12. The terminal P14 is connected to the input of the SAW filter 113. The terminals P15 and P16 are respectively connected to the two outputs of the SAW filter 113, and respectively connected to the reception signal terminals Rx21 and Rx22. The other end of the inductor 43 and an end of the capacitor 44 in the phase circuit 40 are connected to the input of the SAW filter 111 through the terminal P11. The other end of the capacitor 45 and an end of the inductor 46 in the phase circuit 40 are connected to the input of the SAW filter 113 through the terminal P14.

The switch circuit 50 includes the ports P4 to P6, inductors 51, 55 and 57, capacitors 52 to 54 and 56, a resistor R2, and diodes D3 and D4. The anode of the diode D3, an end of the inductor 51 and an end of each of the capacitors 54 and 56 are connected to the port P4. The other end of the capacitor 54 is grounded. The cathode of the diode D4 and an end of the inductor 55 are connected to the port P5. The other end of the inductor 55 is grounded. The other end of the inductor 51 and the cathode of the diode D4 are connected to the port P6. The anode of the diode D4 is connected to an end of the resistor R2 and grounded through the capacitor 52. The other end of the resistor R2 is connected to the control terminal Vc2 and grounded through the capacitor 53. An end of the inductor 57 is connected to the other end of the capacitor 56. The other end of the inductor 57 is connected to the port P5.

The LPF 60 includes inductors 61 and 65 and capacitors 62 to 64, 66 and 67. An end of the inductor 65 and an end of each of the capacitors 66 and 67 are connected to the transmission signal terminal Tx2. An end of the inductor 61 and an end of each of the capacitors 62 and 63 are connected to the port P5 of the switch circuit 50. The other ends of the inductors 61, 65 and the other ends of the capacitors 63, 66 are respectively connected to each other and grounded through the capacitor 64. The other end of each of the capacitors 62 and 67 is grounded.

The phase circuit 70 includes capacitors 71, 72, 74 and 75, and inductors 73 and 76. An end of each of the capacitors 71 and 72 is connected to the port P6 of the switch circuit 50. An end of the inductor 73 is connected to the other end of the capacitor 72. The other end of the inductor 73 and an end of the capacitor 74 are connected to the input of the SAW filter 115. The other end of the capacitor 74 is grounded. An end of the capacitor 75 is connected to the other end of the capacitor 72. The other end of the capacitor 75 and an end of the inductor 76 are connected to the input of the SAW filter 117. The other end of the inductor 76 is grounded.

In the embodiment, the SAW filters 115 and 117 are included in a dual SAW filter 122 that is a single component made up of a combination of the SAW filters 115 and 117. The dual SAW filter 122 has six terminals P21 to P26 and four grounding terminals (not shown). The terminal P21 is connected to the input of the SAW filter 115. The terminals P22 and P23 are respectively connected to the two outputs of the SAW filter 115, and respectively connected to the reception signal terminals Rx31 and Rx32. The terminal P24 is connected to the input of the SAW filter 117. The terminals P25 and P26 are respectively connected to the two outputs of the SAW filter 117, and respectively connected to the reception signal terminals Rx41 and Rx42. The other end of the inductor 73 and an end of the capacitor 74 in the phase circuit 70 are connected to the input of the SAW filter 115 through the terminal P21. The other end of the capacitor 75 and an end of the inductor 76 in the phase circuit 70 are connected to the input of the SAW filter 117 through the terminal P24.

The dual SAW filter 121 outputs an AGSM reception signal in a balanced state from the terminals P12 and P13, and outputs an EGSM reception signal in a balanced state from the terminals P15 and P16. The dual SAW filter 122 outputs a DCS reception signal in a balanced state from the terminals P22 and P23, and outputs a PCS reception signal in a balanced state from the terminals P25 and P26. The dual SAW filters 121 and 122 each correspond to the balanced signal output element of the present invention. The terminals P12, P15, P22 and P25 each correspond to the first output terminal of the present invention, while the terminals P13, P16, P23 and P26 each correspond to the second output terminal of the present invention.

In the high frequency module 1, an AGSM reception signal received at the antenna terminal ANT passes through the diplexer 10, the switch circuit 20, the phase circuit 40 and the SAW filter 111, and is sent to the reception signal terminals Rx11 and Rx12. An EGSM reception signal received at the antenna terminal ANT passes through the diplexer 10, the switch circuit 20, the phase circuit 40 and the SAW filter 113, and is sent to the reception signal terminals Rx21 and Rx22. A DCS reception signal received at the antenna terminal ANT passes through the diplexer 10, the switch circuit 50, the phase circuit 70 and the SAW filter 115, and is sent to the reception signal terminals Rx31 and Rx32. A PCS reception signal received at the antenna terminal ANT passes through the diplexer 10, the switch circuit 50, the phase circuit 70 and the SAW filter 117, and is sent to the reception signal terminals Rx41 and Rx42. An AGSM transmission signal or an EGSM transmission signal received at the transmission signal terminal Tx1 passes through the LPF 30, the switch circuit 20 and the diplexer 10, and is sent to the antenna terminal ANT. A DCS transmission signal or a PCS transmission signal received at the transmission signal terminal Tx2 passes through the LPF 60, the switch circuit 50 and the diplexer 10, and is sent to the antenna terminal ANT.

The diplexer 10 and the switch circuits 20 and 50 separate the AGSM or EGSM reception signal, the AGSM or EGSM transmission signal, the DCS or PCS reception signal and the DCS or PCS transmission signal from one another. The diplexer 10 and the switch circuits 20 and 50 correspond to the separation circuit of the present invention.

Figure 3:
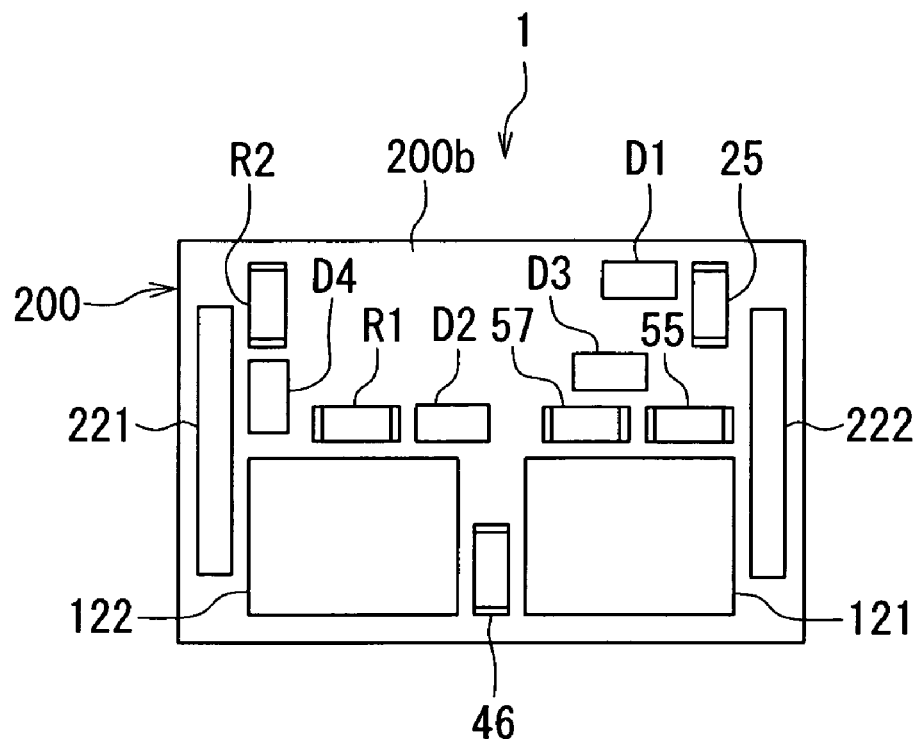
FIG. 3 is a top view of the high frequency module of the embodiment of the invention.
Figure 4:
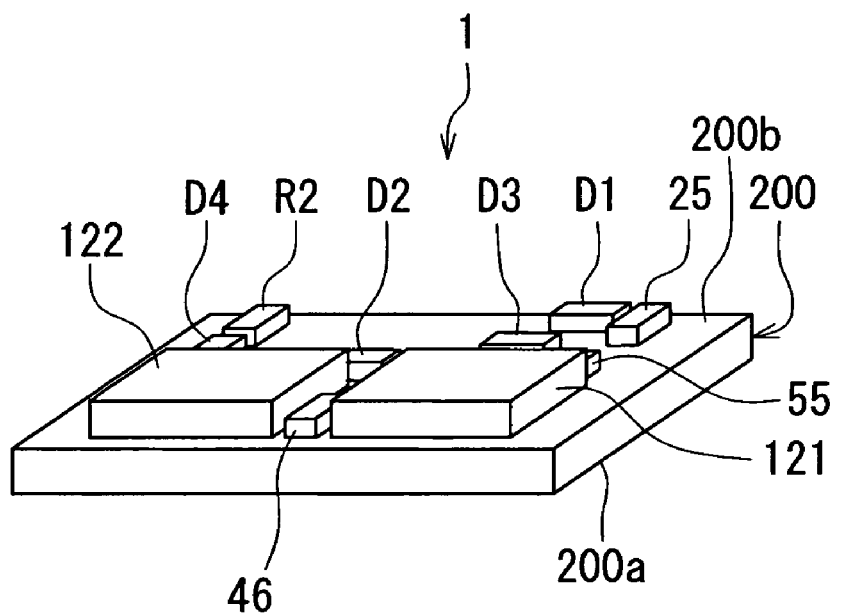
FIG. 4 is a perspective view illustrating the outer appearance of the high frequency module of the embodiment of the invention.

Reference is now made to FIG. 3 and FIG. 4 to describe the structure of the high frequency module 1. FIG. 3 is a top view of the high frequency module 1. FIG. 4 is a perspective view illustrating the outer appearance of the high frequency module 1. As shown in FIG. 3 and FIG. 4, the high frequency module 1 includes a layered substrate 200 for integrating the foregoing components of the high frequency module 1. The layered substrate 200 includes a plurality of dielectric layers and a plurality of conductor layers that are alternately stacked. The layered substrate 200 has a bottom surface 200a and a top surface 200b located on opposite sides in the direction in which the layers are stacked, and four side surfaces that couple the bottom surface 200a and the top surface 200b to each other. The layered substrate 200 is rectangular-solid-shaped.

The circuits of the high frequency module 1 are formed using the conductor layers located inside the layered substrate 200 or on the surfaces of the layered substrate 200, and elements mounted on the top surface 200b of the layered substrate 200. Here, by way of example, the dual SAW filters 121 and 122, the diodes D1 to D4, the resistors R1 and R2, and the inductors 25, 46, 55 and 57 of FIG. 2 are mounted on the top surface 200b of the layered substrate 200. The layered substrate 200 is a multilayer substrate of low-temperature co-fired ceramic, for example.

The terminals ANT, Rx11, Rx12, Rx21, Rx22, Rx31, Rx32, Rx41, Rx42, Tx1, Tx2, Vc1 and Vc2, and a plurality of ground terminals that will be described later are disposed on the bottom surface 200a of the layered substrate 200.

Reference is now made to FIG. 5 to FIG. 21 to describe an example of configuration of the layered substrate 200. FIG. 5 to FIG. 20 respectively illustrate the top surfaces of the first to sixteenth (the lowest) dielectric layers from the top. FIG. 21 illustrates the sixteenth dielectric layer from the top and a conductor layer therebelow as seen from above. Small circles in FIG. 5 to FIG. 20 indicate through holes.

Figure 5:
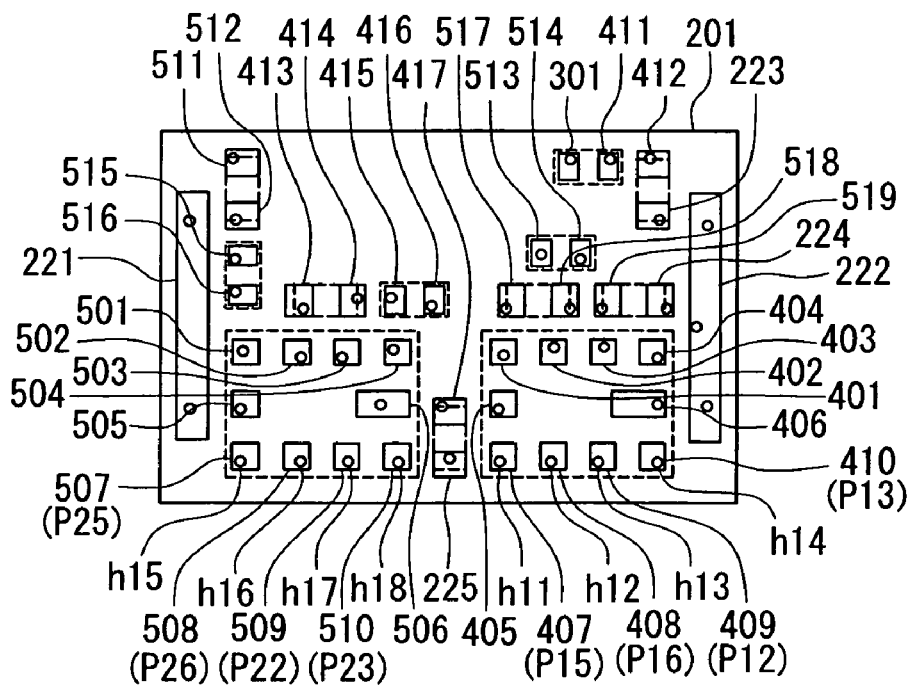
FIG. 5 is a top view illustrating the top surface of the first dielectric layer of the layered substrate of FIG. 3.

On the top surface of the first dielectric layer 201 of FIG. 5 there are formed ten conductor layers 401 to 410 to which the terminals P11 to P16 and the four grounding terminals (not shown) of the dual SAW filter 121 are connected, and ten conductor layers 501 to 510 to which the terminals P21 to P26 and the four grounding terminals (not shown) of the dual SAW filter 122 are connected. Conductor layers 221 to 225, 301, 411 to 417 and 511 to 519 are further formed on the top surface of the dielectric layer 201.

The terminals P11, P12, P13, P14, P15 and P16 of the dual SAW filter 121 are connected to the conductor layers 404, 409, 410, 401, 407 and 408, respectively. The four grounding terminals (not shown) of the dual SAW filter 121 are connected to the conductor layers 402, 403, 405 and 406, respectively.

The terminals P21, P22, P23, P24, P25 and P26 of the dual SAW filter 122 are connected to the conductor layers 504, 509, 510, 501, 507 and 508, respectively. The four grounding terminals (not shown) of the dual SAW filter 122 are connected to the conductor layers 502, 503, 505 and 506, respectively.

The anode of the diode D1 is connected to the conductor layer 301 while the cathode thereof is connected to the conductor layer 411. The anode of the diode D2 is connected to the conductor layer 415 while the cathode thereof is connected to the conductor layer 416. The anode of the diode D3 is connected to the conductor layer 513 while the cathode thereof is connected to the conductor layer 514. The anode of the diode D4 is connected to the conductor layer 515 while the cathode thereof is connected to the conductor layer 516. An end of the resistor R1 is connected to the conductor layer 413 while the other end of the resistor R1 is connected to the conductor layer 414. An end of the resistor R2 is connected to the conductor layer 511 while the other end of the resistor R2 is connected to the conductor layer 512.

An end of the inductor 25 is connected to the conductor layer 223 while the other end of the inductor 25 is connected to the conductor layer 412. An end of the inductor 46 is connected to the conductor layer 225 while the other end of the inductor 46 is connected to the conductor layer 417. An end of the inductor 55 is connected to the conductor layer 224 while the other end of the inductor 55 is connected to the conductor layer 519. An end of the inductor 57 is connected to the conductor layer 517 while the other end of the inductor 57 is connected to the conductor layer 518.

The dielectric layer 201 has through holes hi11, h12, h13, h14, h15, h16, h17 and h18 that are respectively connected to the conductor layers 407, 408, 409, 410, 507, 508, 509 and 510. The dielectric layer 201 has a number of through holes, as shown in FIG. 5, besides those indicated with numerals.

Figure 6:
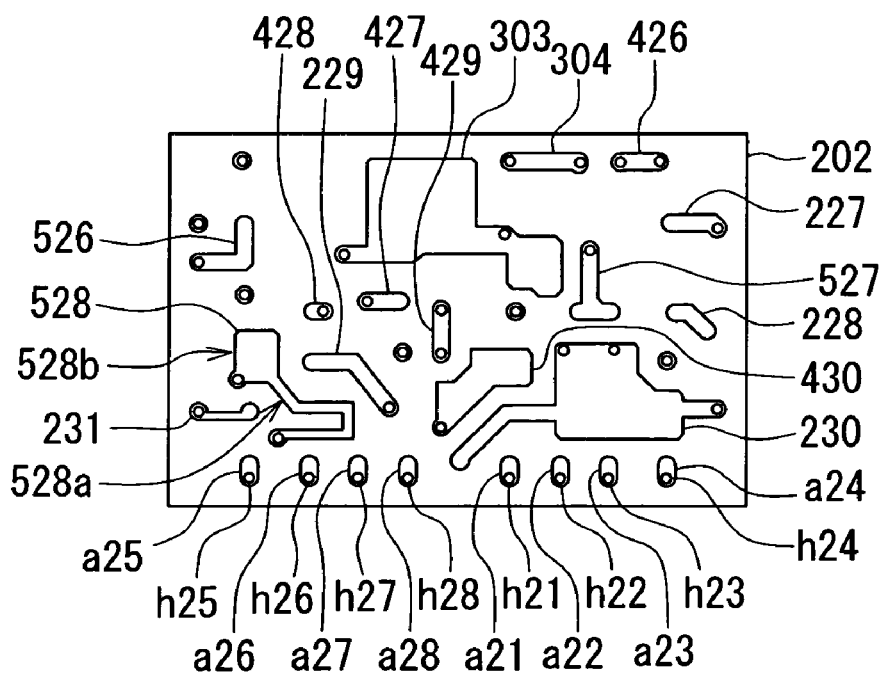
FIG. 6 is a top view illustrating the top surface of the second dielectric layer of the layered substrate of FIG. 3.

On the top surface of the second dielectric layer 202 of FIG. 6 there are formed capacitor-forming conductor layers 303 and 430, position-adjusting conductor layers a21 to a28, and conductor layers 227 to 231, 304, 426 to 429 and 526 to 528. The conductor layer 528 includes an inductor-forming portion 528a and a capacitor-forming portion 528b.

The conductor layer 303 forms part of each of the capacitors 14 and 56 of FIG. 2. The conductor layer 513 of FIG. 5 is connected to the conductor layer 303 via a through hole formed in the dielectric layer 201. The conductor layer 430 forms part of the capacitor 45 of FIG. 2. The conductor layers 401 and 417 of FIG. 5 are connected to the conductor layer 430 via through holes formed in the dielectric layer 201. The capacitor-forming portion 528b of the conductor layer 528 forms part of the capacitor 75 of FIG. 2. The conductor layer 501 of FIG. 5 is connected to the conductor layer 528 via a through hole formed in the dielectric layer 201. The inductor-forming portion 528a of the conductor layer 528 forms part of the inductor 76 of FIG. 2.

The conductor layers 222 and 223 of FIG. 5 are connected to the conductor layer 227 via through holes formed in the dielectric layer 201. The conductor layers 222 and 224 of FIG. 5 are connected to the conductor layer 228 via through holes formed in the dielectric layer 201. The conductor layers 502, 503 and 506 of FIG. 5 are connected to the conductor layer 229 via through holes formed in the dielectric layer 201. The conductor layers 222, 225, 402, 403, 405 and 406 of FIG. 5 are connected to the conductor layer 230 via through holes formed in the dielectric layer 201. The conductor layers 221 and 505 of FIG. 5 are connected to the conductor layer 231 via through holes formed in the dielectric layer 201.

The conductor layer 301 of FIG. 5 is connected to the conductor layer 304 via a through hole formed in the dielectric layer 201. The conductor layers 411 and 412 of FIG. 5 are connected to the conductor layer 426 via through holes formed in the dielectric layer 201. The conductor layers 414 and 415 of FIG. 5 are connected to the conductor layer 427 via through holes formed in the dielectric layer 201. The conductor layer 413 of FIG. 5 is connected to the conductor layer 428 via a through hole formed in the dielectric layer 201. The conductor layer 416 of FIG. 5 is connected to the conductor layer 429 via a through hole formed in the dielectric layer 201.

The conductor layers 512 and 515 of FIG. 5 are connected to the conductor layer 526 via through holes formed in the dielectric layer 201. The conductor layers 514, 518 and 519 of FIG. 5 are connected to the conductor layer 527 via through holes formed in the dielectric layer 201.

The conductor layers 407 to 410 and 507 to 510 of FIG. 5 are connected to the conductor layers a21 to a28 via the through holes hi11 to h18, respectively.

The dielectric layer 202 has through holes h21 to h28 respectively connected to the conductor layers a21 to a28. The dielectric layer 202 has a number of through holes, as shown in FIG. 6, besides those indicated with numerals.

Figure 7:
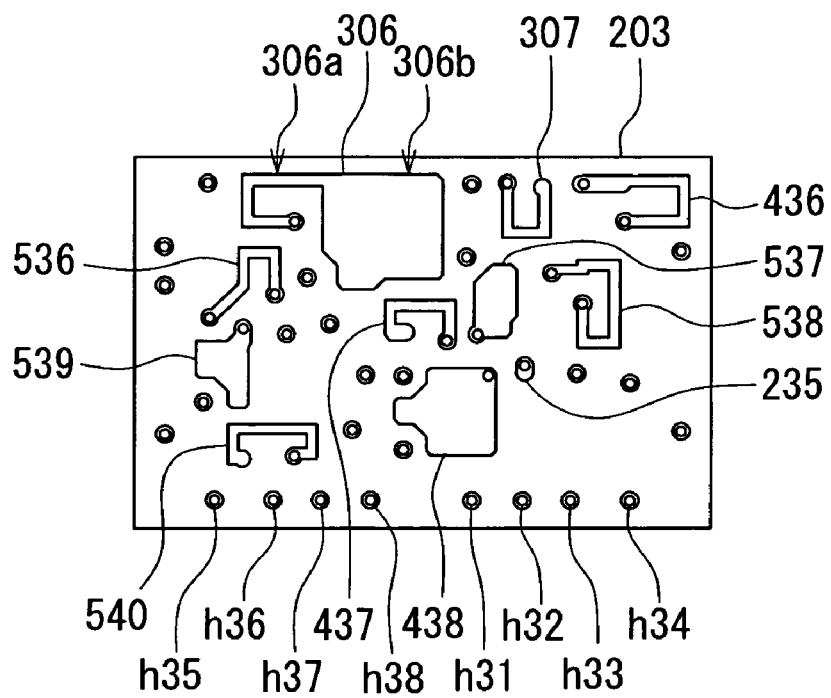
FIG. 7 is a top view illustrating the top surface of the third dielectric layer of the layered substrate of FIG. 3.

On the top surface of the third dielectric layer 203 of FIG. 7 there are formed capacitor-forming conductor layers 438, 537 and 539, conductor layers 235 and 306, and inductor-forming conductor layers 307, 436, 437, 536, 538 and 540. The conductor layer 306 includes an inductor-forming portion 306a and a capacitor-forming portion 306b. The conductor layer 230 of FIG. 6 is connected to the conductor layer 235 via through holes formed in the dielectric layer 202.

The capacitor-forming portion 306b of the conductor layer 306, together with part of the conductor layer 303 of FIG. 6, forms the capacitor 14 of FIG. 2, and also forms part of the capacitor 13 of FIG. 2. The conductor layer 438 forms part of the capacitor 45 of FIG. 2. The conductor layer 537 forms part of the capacitor 56 of FIG. 2. The conductor layer 517 of FIG. 5 is connected to the conductor layer 537 via through holes formed in the dielectric layers 201 and 202. The conductor layer 539 forms part of the capacitor 75 of FIG. 2.

The inductor-forming portion 306a of the conductor layer 306 forms part of the inductor 15 of FIG. 2. The conductor layer 304 of FIG. 6 is connected to the conductor layer 307 via through holes formed in the dielectric layer 202. The conductor layer 307 forms part of the inductor 11 of FIG. 2. The conductor layer 426 of FIG. 6 is connected to the conductor layer 436 via through holes formed in the dielectric layer 202. The conductor layer 436 forms part of the inductor 31 of FIG. 2. The conductor layer 429 of FIG. 6 is connected to the conductor layer 437 via through holes formed in the dielectric layer 202. The conductor layer 437 forms part of the inductor 21 of FIG. 2

The conductor layer 516 of FIG. 5 is connected to the conductor layer 536 via through holes formed in the dielectric layers 201 and 202. The conductor layer 536 forms part of the inductor 51 of FIG. 2. The conductor layer 527 of FIG. 6 is connected to the conductor layer 538 via a through hole formed in the dielectric layer 202. The conductor layer 538 forms part of the inductor 61 of FIG. 2. The conductor layer 528 of FIG. 6 is connected to the conductor layer 540 via through holes formed in the dielectric layer 202. The conductor layer 540 forms part of the inductor 76 of FIG. 2.

The dielectric layer 203 has through holes h31 to h38 respectively connected to the through holes h21 to h28. The dielectric layer 203 has a number of through holes, as shown in FIG. 7, besides those indicated with numerals.

Figure 8:
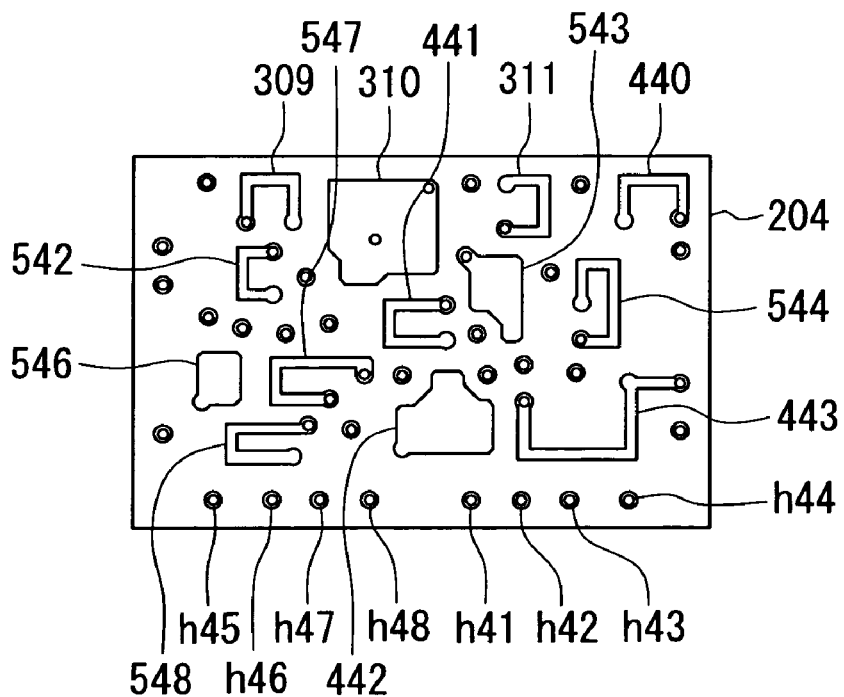
FIG. 8 is a top view illustrating the top surface of the fourth dielectric layer of the layered substrate of FIG. 3.

On the top surface of the fourth dielectric layer 204 of FIG. 8 there are formed capacitor-forming conductor layers 310, 442, 543 and 546 and inductor-forming conductor layers 309, 311, 440, 441, 443, 542, 544, 547 and 548. The conductor layer 310, together with the capacitor-forming portion 306b of the conductor layer 306 of FIG. 7, forms the capacitor 13 of FIG. 2. The conductor layer 442 forms part of the capacitor 45 of FIG. 2. The conductor layer 430 of FIG. 6 is connected to the conductor layer 442 via through holes formed in the dielectric layers 202 and 203. The conductor layer 543 forms part of the capacitor 56 of FIG. 2. The conductor layer 303 of FIG. 6 is connected to the conductor layer 543 via through holes formed in the dielectric layers 202 and 203. The conductor layer 546 forms part of the capacitor 75 of FIG. 2. The conductor layer 528 of FIG. 6 is connected to the conductor layer 546 via through holes formed in the dielectric layers 202 and 203.

The conductor layer 306 of FIG. 7 is connected to the conductor layer 309 via a through hole formed in the dielectric layer 203. The conductor layer 309 forms part of the inductor 15 of FIG. 2. The conductor layer 307 of FIG. 7 is connected to the conductor layer 311 via a through hole formed in the dielectric layer 203. The conductor layer 311 forms part of the inductor 11 of FIG. 2. The conductor layer 436 of FIG. 7 is connected to the conductor layer 440 via through holes formed in the dielectric layer 203. The conductor layer 440 forms part of the inductor 31 of FIG. 2. The conductor layer 437 of FIG. 7 is connected to the conductor layer 441 via a through hole formed in the dielectric layer 203. The conductor layer 441 forms part of the inductor 21 of FIG. 2. The conductor layer 404 of FIG. 5 is connected to the conductor layer 443 via through holes formed in the dielectric layers 201 to 203. The conductor layer 443 forms part of the inductor 43 of FIG. 2.

The conductor layer 536 of FIG. 7 is connected to the conductor layer 542 via through holes formed in the dielectric layer 203. The conductor layer 542 forms part of the inductor 51 of FIG. 2. The conductor layer 538 of FIG. 7 is connected to the conductor layer 544 via through holes formed in the dielectric layer 203. The conductor layer 544 forms part of the inductor 61 of FIG. 2. The conductor layer 504 of FIG. 5 is connected to the conductor layer 547 via through holes formed in the dielectric layers 201 to 203. The conductor layer 547 forms part of the inductor 73 of FIG. 2. The conductor layer 540 of FIG. 7 is connected to the conductor layer 548 via a through hole formed in the dielectric layer 203. The conductor layer 548 forms part of the inductor 76 of FIG. 2.

The dielectric layer 204 has through holes h41 to h48 respectively connected to the through holes h31 to h38. The dielectric layer 204 has a number of through holes, as shown in FIG. 8, besides those indicated with numerals.

Figure 9:
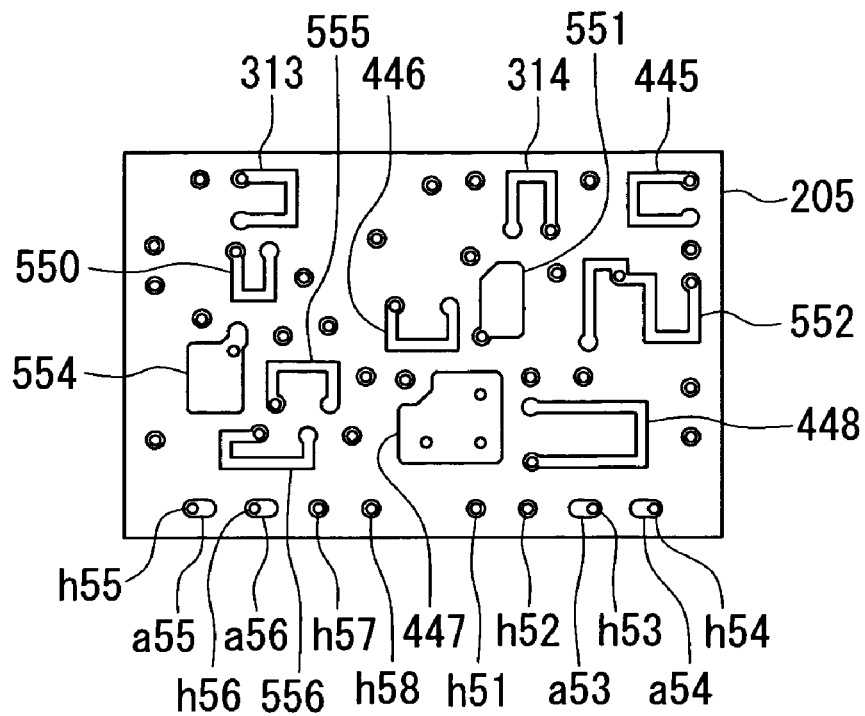
FIG. 9 is a top view illustrating the top surface of the fifth dielectric layer of the layered substrate of FIG. 3.

On the top surface of the fifth dielectric layer 205 of FIG. 9 there are formed capacitor-forming conductor layers 447, 551 and 554, inductor-forming conductor layers 313, 314, 445, 446, 448, 550, 552, 555 and 556, and position-adjusting conductor layers a53, a54, a55 and a56. The conductor layer 447, together with the conductor layers 430, 438 and 442, forms the capacitor 45 of FIG. 2. The conductor layer 438 of FIG. 7 is connected to the conductor layer 447 via through holes formed in the dielectric layers 203 and 204. The conductor layer 551 forms part of the capacitor 56 of FIG. 2. The conductor layer 537 of FIG. 7 is connected to the conductor layer 551 via through holes formed in the dielectric layers 203 and 204. The conductor layer 554, together with the conductor layers 539 and 546 and the capacitor-forming portion 528b of the conductor layer 528, forms the capacitor 75 of FIG. 2. The conductor layer 539 of FIG. 7 is connected to the conductor layer 554 via through holes formed in the dielectric layers 203 and 204.

The conductor layer 309 of FIG. 8 is connected to the conductor layer 313 via a through hole formed in the dielectric layer 204. The conductor layer 313 forms part of the inductor 15 of FIG. 2. The conductor layer 311 of FIG. 8 is connected to the conductor layer 314 via a through hole formed in the dielectric layer 204. The conductor layer 314 forms part of the inductor 11 of FIG. 2. The conductor layer 440 of FIG. 8 is connected to the conductor layer 445 via a through hole formed in the dielectric layer 204. The conductor layer 445 forms part of the inductor 31 of FIG. 2. The conductor layer 441 of FIG. 8 is connected to the conductor layer 446 via a through hole formed in the dielectric layer 204. The conductor layer 446 forms part of the inductor 21 of FIG. 2. The conductor layer 443 of FIG. 8 is connected to the conductor layer 448 via through holes formed in the dielectric layer 204. The conductor layer 448 forms part of the inductor 43 of FIG. 2.

The conductor layer 542 of FIG. 8 is connected to the conductor layer 550 via a through hole formed in the dielectric layer 204. The conductor layer 550 forms part of the inductor 51 of FIG. 2. The conductor layer 544 of FIG. 8 is connected to the conductor layer 552 via a through hole formed in the dielectric layer 204. The conductor layer 552 forms part of each of the inductors 61 and 65 of FIG. 2. The inductor 61 of FIG. 2 is composed of the conductor layers 538 and 544 and part of the conductor layer 552. The conductor layer 547 of FIG. 8 is connected to the conductor layer 555 via through holes formed in the dielectric layer 204. The conductor layer 555 forms part of the inductor 73 of FIG. 2. The conductor layer 548 of FIG. 8 is connected to the conductor layer 556 via a through hole formed in the dielectric layer 204. The conductor layer 556 forms part of the inductor 76 of FIG. 2. The through holes h43, h44, h45 and h46 are respectively connected to the conductor layers a53, a54, a55 and a56.

The dielectric layer 205 has through holes h51, h52, h57 and h58 respectively connected to the through holes h41, h42, h47 and h48, and through holes h53, h54, h55 and h56 respectively connected to the conductor layers a53, a54, a55 and a56. The dielectric layer 205 has a number of through holes, as shown in FIG. 9, besides those indicated with numerals.

Figure 10:
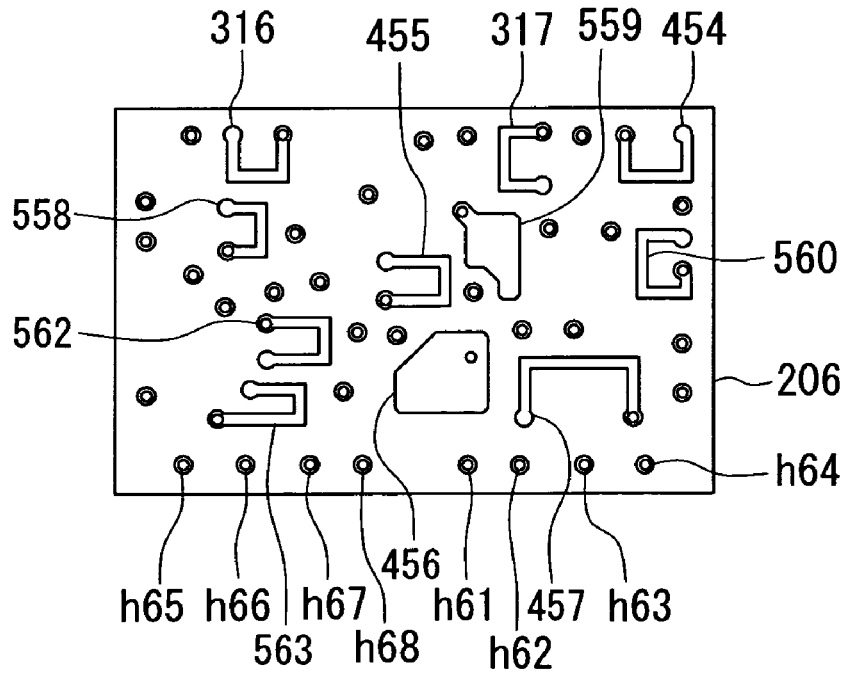
FIG. 10 is a top view illustrating the top surface of the sixth dielectric layer of the layered substrate of FIG. 3.

On the top surface of the sixth dielectric layer 206 of FIG. 10 there are formed capacitor-forming conductor layers 456 and 559, and inductor-forming conductor layers 316, 317, 454, 455, 457, 558, 560, 562 and 563. The conductor layer 456 forms part of the capacitor 42 of FIG. 2. The conductor layer 447 of FIG. 9 is connected to the conductor layer 456 via through holes formed in the dielectric layer 205. The conductor layer 559 forms part of the capacitor 56 of FIG. 2. The conductor layer 543 of FIG. 8 is connected to the conductor layer 559 via through holes formed in the dielectric layers 204 and 205.

The conductor layer 313 of FIG. 9 is connected to the conductor layer 316 via a through hole formed in the dielectric layer 205. The inductor 15 of FIG. 2 is composed of the conductor layers 309, 313 and 316 and the inductor-forming portion 306a of the conductor layer 306. The conductor layer 314 of FIG. 9 is connected to the conductor layer 317 via a through hole formed in the dielectric layer 205. The conductor layer 317 forms part of the inductor 11 of FIG. 2. The conductor layer 445 of FIG. 9 is connected to the conductor layer 454 via a through hole formed in the dielectric layer 205. The conductor layer 454 forms part of the inductor 31 of FIG. 2. The conductor layer 446 of FIG. 9 is connected to the conductor layer 455 via a through hole formed in the dielectric layer 205. The conductor layer 455 forms part of the inductor 21 of FIG. 2. The conductor layer 448 of FIG. 9 is connected to the conductor layer 457 via a through hole formed in the dielectric layer 205. The conductor layer 457 forms part of the inductor 43 of FIG. 2.

The conductor layer 550 of FIG. 9 is connected to the conductor layer 558 via a through hole formed in the dielectric layer 205. The conductor layer 558 forms part of the inductor 51 of FIG. 2. The conductor layer 552 of FIG. 9 is connected to the conductor layer 560 via through holes formed in the dielectric layer 205. The inductor 65 of FIG. 2 is composed of the conductor layer 560 and part of the conductor layer 552. The conductor layer 555 of FIG. 9 is connected to the conductor layer 562 via a through hole formed in the dielectric layer 205. The conductor layer 562 forms part of the inductor 73 of FIG. 2. The conductor layer 556 of FIG. 9 is connected to the conductor layer 563 via a through hole formed in the dielectric layer 205. The conductor layer 563 forms part of the inductor 76 of FIG. 2.

The dielectric layer 206 has through holes h61 to h68 respectively connected to the through holes h51 to h58. The dielectric layer 206 has a number of through holes, as shown in FIG. 10, besides those indicated with numerals.

Figure 11:
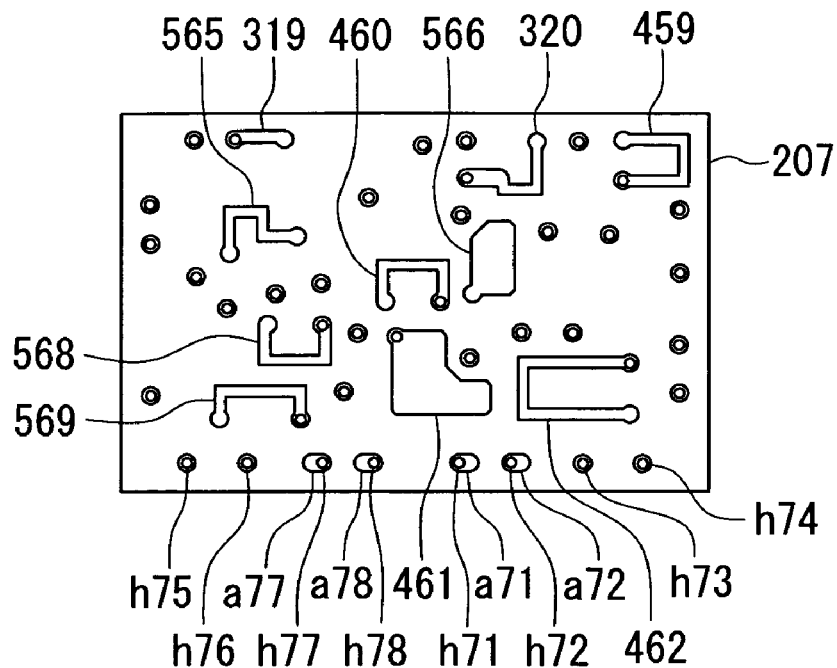
FIG. 11 is a top view illustrating the top surface of the seventh dielectric layer of the layered substrate of FIG. 3.

On the top surface of the seventh dielectric layer 207 of FIG. 11 there are formed capacitor-forming conductor layers 461 and 566, inductor-forming conductor layers 320, 459, 460, 462, 565, 568 and 569, a conductor layer 319, and position-adjusting conductor layers a71, a72, a77 and a78. The conductor layer 461 forms part of the capacitor 42 of FIG. 2. The conductor layer 429 of FIG. 6 is connected to the conductor layer 461 via through holes formed in the dielectric layers 202 to 206. The conductor layer 566 forms part of the capacitor 56 of FIG. 2. The conductor layer 551 of FIG. 9 is connected to the conductor layer 566 via through holes formed in the dielectric layers 205 and 206.

The conductor layer 316 of FIG. 10 is connected to the conductor layer 319 via a through hole formed in the dielectric layer 206. The conductor layer 317 of FIG. 10 is connected to the conductor layer 320 via a through hole formed in the dielectric layer 206. The inductor 11 of FIG. 2 is composed of the conductor layers 307, 311, 314, 317 and 320.

The conductor layer 454 of FIG. 10 is connected to the conductor layer 459 via a through hole formed in the dielectric layer 206. The inductor 31 of FIG. 2 is composed of the conductor layers 436, 440, 445, 454 and 459. The conductor layer 455 of FIG. 10 is connected to the conductor layer 460 via a through hole formed in the dielectric layer 206. The conductor layer 460 forms part of the inductor 21 of FIG. 2.

The conductor layer 457 of FIG. 10 is connected to the conductor layer 462 via a through hole formed in the dielectric layer 206. The conductor layer 462 forms part of the inductor 43 of FIG. 2.

The conductor layer 558 of FIG. 10 is connected to the conductor layer 565 via a through hole formed in the dielectric layer 206. The conductor layer 303 of FIG. 6 is also connected to the conductor layer 565 via through holes formed in the dielectric layers 202 to 206. The inductor 51 of FIG. 2 is composed of the conductor layers 536, 542, 550, 558 and 565. The conductor layer 562 of FIG. 10 is connected to the conductor layer 568 via a through hole formed in the dielectric layer 206. The inductor 73 of FIG. 2 is composed of the conductor layers 547, 555, 562 and 568. The conductor layer 563 of FIG. 10 is connected to the conductor layer 569 via a through hole formed in the dielectric layer 206. The conductor layer 569 forms part of the inductor 76 of FIG. 2. The through holes h61, h62, h67 and h68 are respectively connected to the conductor layers a71, a72, a77 and a78.

The dielectric layer 207 has through holes h71, h72, h77 and h78 respectively connected to the conductor layers a71, a72, a77 and a78, and through holes h73, h74, h75 and h76 respectively connected to the through holes h63, h64, h65 and h66. The dielectric layer 207 has a number of through holes, as shown in FIG. 11, besides those indicated with numerals.

Figure 12:
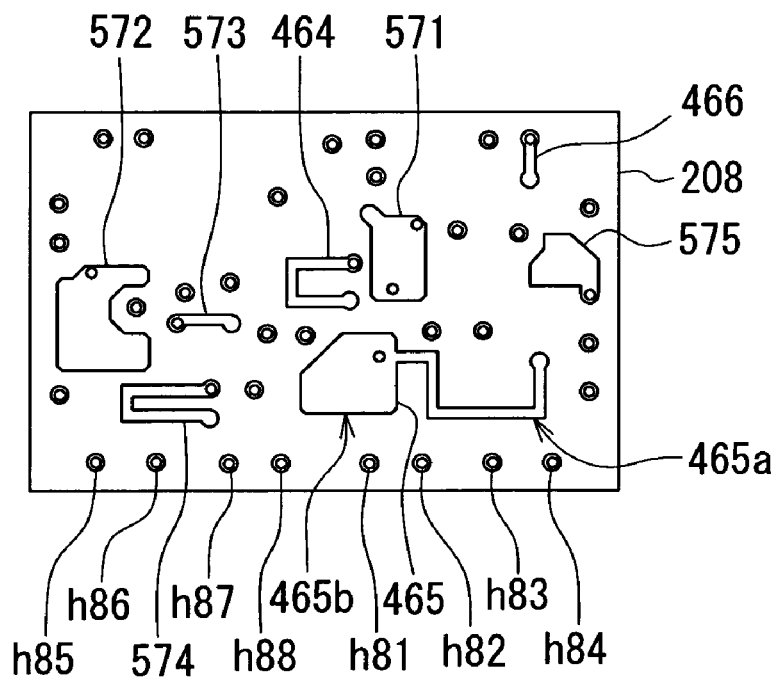
FIG. 12 is a top view illustrating the top surface of the eighth dielectric layer of the layered substrate of FIG. 3.

On the top surface of the eighth dielectric layer 208 of FIG. 12 there are formed capacitor-forming conductor layers 571, 572 and 575, inductor-forming conductor layers 464 and 574, and conductor layers 465, 573 and 466. The conductor layer 465 includes an inductor-forming portion 465a and a capacitor-forming portion 465b. The conductor layer 571, together with the conductor layers 537, 543, 551, 559 and 566 and another part of the conductor layer 303, forms the capacitor 56 of FIG. 2. The conductor layer 559 of FIG. 10 is connected to the conductor layer 571 via through holes formed in the dielectric layers 206 and 207. The conductor layer 572 forms part of the capacitor 72 of FIG. 2. The conductor layer 536 of FIG. 7 is connected to the conductor layer 572 via through holes formed in the dielectric layers 203 to 207.

The capacitor-forming portion 465b of the conductor layer 465 forms part of the capacitor 42 of FIG. 2. The conductor layer 462 of FIG. 11 is connected to the conductor layer 465 via a through hole formed in the dielectric layer 207. The conductor layer 456 of FIG. 10 is also connected to the conductor layer 465 via through holes formed in the dielectric layers 206 and 207. The inductor 43 of FIG. 2 is composed of the conductor layers 443, 448, 457 and 462 and the inductor-forming portion 465a of the conductor layer 465.

The conductor layer 460 of FIG. 11 is connected to the conductor layer 464 via a through hole formed in the dielectric layer 207. The conductor layer 464 forms part of the inductor 21 of FIG. 2. The conductor layer 569 of FIG. 11 is connected to the conductor layer 574 via a through hole formed in the dielectric layer 207. The conductor layer 574 forms part of the inductor 76 of FIG. 2.

The conductor layer 459 of FIG. 11 is connected to the conductor layer 466 via a through hole formed in the dielectric layer 207. The conductor layer 568 of FIG. 11 is connected to the conductor layer 573 via a through hole formed in the dielectric layer 207. The conductor layer 560 of FIG. 10 is connected to the conductor layer 575 via through holes formed in the dielectric layers 206 and 207.

The dielectric layer 208 has through holes h81 to h88 respectively connected to the through holes h71 to h78. The dielectric layer 208 has a number of through holes, as shown in FIG. 12, besides those indicated with numerals.

Figure 13:
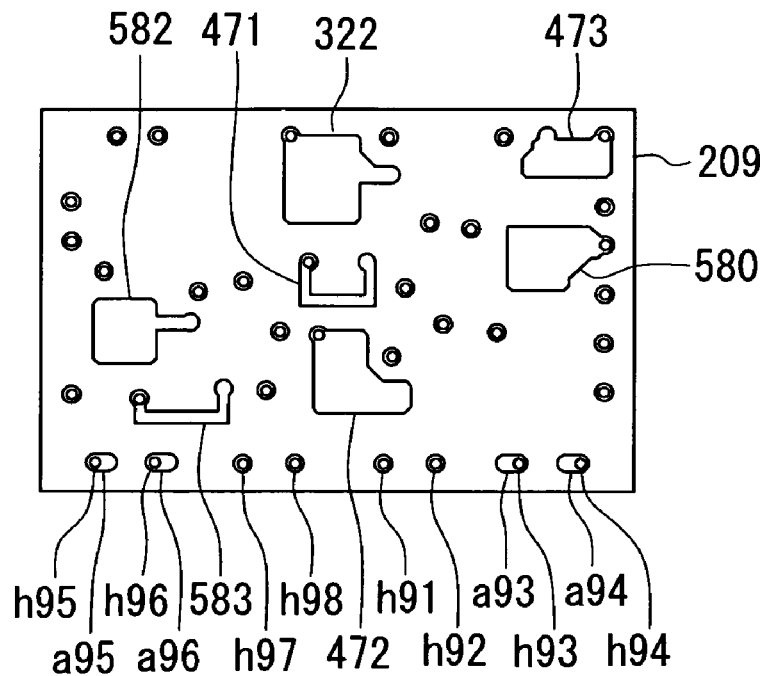
FIG. 13 is a top view illustrating the top surface of the ninth dielectric layer of the layered substrate of FIG. 3.

On the ninth dielectric layer 209 of FIG. 13 there are formed capacitor-forming conductor layers 322, 472, 473, 580 and 582, inductor-forming conductor layers 471 and 583, and position-adjusting conductor layers a93, a94, a95 and a96. The conductor layer 322 forms part of the capacitor 12 of FIG. 2. The conductor layer 320 of FIG. 11 is connected to the conductor layer 322 via through holes formed in the dielectric layers 207 and 208. The conductor layer 310 of FIG. 8 is also connected to the conductor layer 322 via through holes formed in the dielectric layers 204 to 208. The conductor layer 472 forms part of the capacitor 42 of FIG. 2. The conductor layer 461 of FIG. 11 is connected to the conductor layer 472 via through holes formed in the dielectric layers 207 and 208. The conductor layer 473 forms part of the capacitor 33 of FIG. 2. The conductor layer 466 of FIG. 12 is connected to the conductor layer 473 via a through hole formed in the dielectric layer 208.

The conductor layer 580 forms part of each of the capacitors 63 and 66 of FIG. 2. The conductor layer 552 of FIG. 9 is connected to the conductor layer 580 via through holes formed in the dielectric layers 205 to 208. The conductor layer 582 forms part of the capacitor 72 of FIG. 2. The conductor layer 573 of FIG. 12 is connected to the conductor layer 582 via a through hole formed in the dielectric layer 208. The conductor layer 554 of FIG. 9 is also connected to the conductor layer 582 via through holes formed in the dielectric layers 205 to 208.

The conductor layer 464 of FIG. 12 is connected to the conductor layer 471 via a through hole formed in the dielectric layer 208. The inductor 21 of FIG. 2 is composed of the conductor layers 437, 441, 446, 455, 460, 464 and 471. The conductor layer 574 of FIG. 12 is connected to the conductor layer 583 via a through hole formed in the dielectric layer 208. The inductor 76 of FIG. 2 is composed of the conductor layers 540, 548, 556, 563, 569, 574 and 583 and the inductor-forming portion 528a of the conductor layer 528. The through holes h83, h84, h85 and h86 are respectively connected to the conductor layers a93, a94, a95 and a96.

The dielectric layer 209 has through holes h91, h92, h97 and h98 respectively connected to the through holes h81, h82, h87 and h88, and through holes h93, h94, h95 and h96 respectively connected to the conductor layers a93, a94, a95 and a96. The dielectric layer 209 has a number of through holes, as shown in FIG. 13, besides those indicated with numerals.

Figure 14:
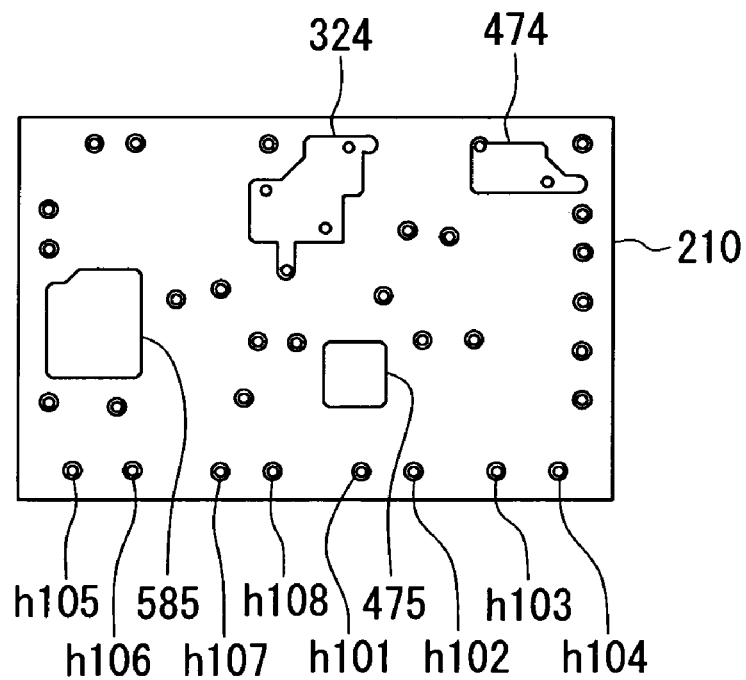
FIG. 14 is a top view illustrating the top surface of the tenth dielectric layer of the layered substrate of FIG. 3.

On the tenth dielectric layer 210 of FIG. 14 there are formed capacitor-forming conductor layers 324, 474, 475 and 585. The conductor layer 324, together with the conductor layer 322 of FIG. 13, forms the capacitor 12 of FIG. 2. The conductor layer 471 of FIG. 13 is connected to the conductor layer 324 via a through hole formed in the dielectric layer 209. The conductor layer 304 of FIG. 6 is also connected to the conductor layer 324 via through holes formed in the dielectric layers 202 to 209.

The conductor layer 474 forms part of the capacitor 33 of FIG. 2. The conductor layer 436 of FIG. 7 is connected to the conductor layer 474 via through holes formed in the dielectric layers 203 to 209. The conductor layer 475 forms part of the capacitor 42 of FIG. 2. The conductor layer 465 of FIG. 12 is connected to the conductor layer 475 via through holes formed in the dielectric layers 208 and 209. The conductor layer 585 forms part of the capacitor 71 of FIG. 2. The conductor layer 585, together with the conductor layers 572 and 582, forms the capacitor 72 of FIG. 2. The conductor layer 572 of FIG. 12 is connected to the conductor layer 585 via through holes formed in the dielectric layers 208 and 209.

The dielectric layer 210 has through holes h101 to h108 respectively connected to the through holes h91 to h98. The dielectric layer 210 has a number of through holes, as shown in FIG. 14, besides those indicated with numerals.

Figure 15:
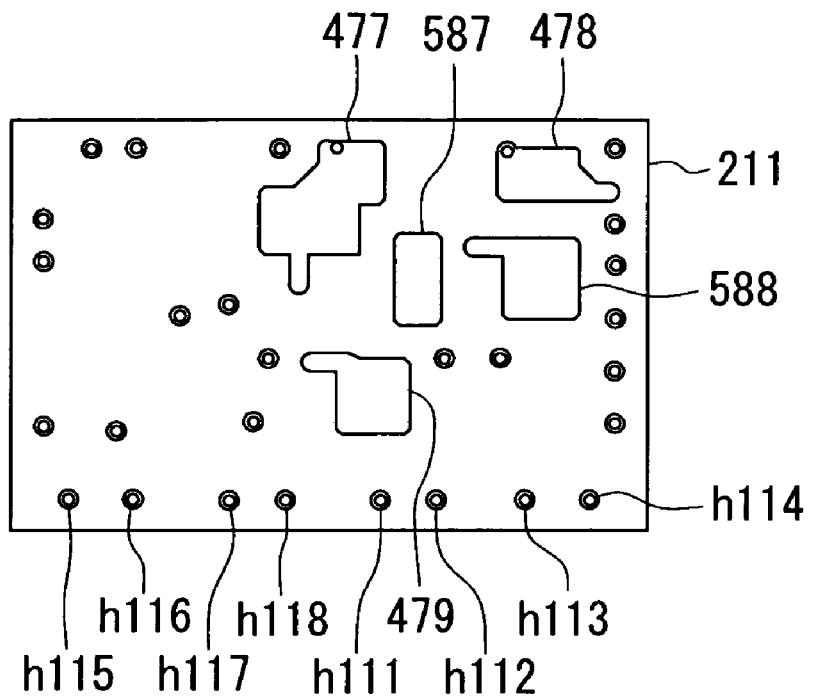
FIG. 15 is a top view illustrating the top surface of the eleventh dielectric layer of the layered substrate of FIG. 3.

On the eleventh dielectric layer 211 of FIG. 15 there are formed capacitor-forming conductor layers 477 to 479, 587 and 588. The conductor layer 477 forms part of the capacitor 24 of FIG. 2. The conductor layer 324 of FIG. 14 is connected to the conductor layer 477 via through holes formed in the dielectric layer 210. The conductor layer 478, together with the conductor layer 473 of FIG. 13 and the conductor layer 474 of FIG. 14, forms the capacitor 33 of FIG. 2, and also forms part of the capacitor 32 of FIG. 2. The conductor layer 474 of FIG. 14 is connected to the conductor layer 478 via through holes formed in the dielectric layer 210. The conductor layer 479 forms part of the capacitor 41 of FIG. 2. The conductor layer 479, together with the conductor layers 456, 461, 472 and 475 and the capacitor-forming portion 465b of the conductor layer 465, forms the capacitor 42 of FIG. 2. The conductor layer 472 of FIG. 13 is connected to the conductor layer 479 via through holes formed in the dielectric layers 209 and 210.

The conductor layer 587 forms part of the capacitor 54 of FIG. 2. The conductor layer 571 of FIG. 12 is connected to the conductor layer 587 via through holes formed in the dielectric layers 208 to 210. The conductor layer 588 forms part of the capacitor 62 of FIG. 2. The conductor layer 588, together with the conductor layer 580, forms the capacitor 66 of FIG. 2. The conductor layer 538 of FIG. 7 is connected to the conductor layer 588 via through holes formed in the dielectric layers 203 to 210.

The dielectric layer 211 has through holes h111 to h118 respectively connected to the through holes h101 to h108. The dielectric layer 211 has a number of through holes, as shown in FIG. 15, besides those indicated with numerals.

Figure 16:
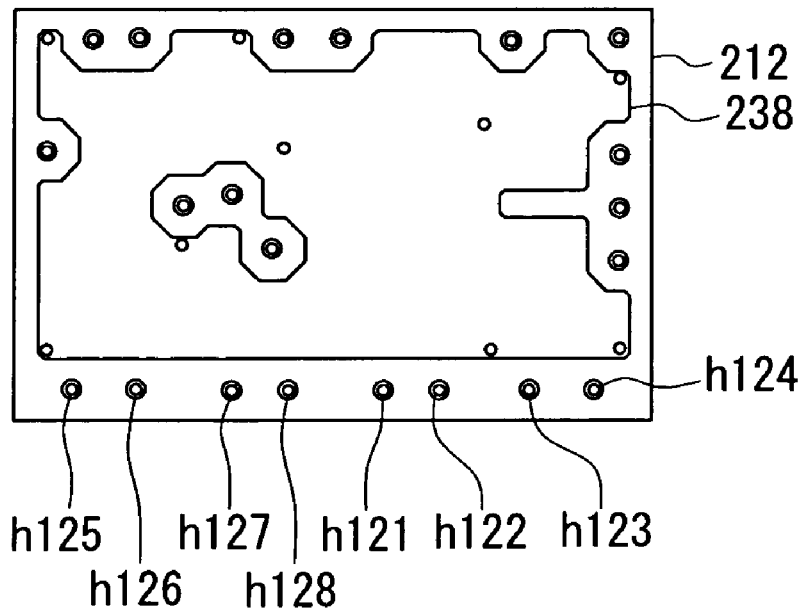
FIG. 16 is a top view illustrating the top surface of the twelfth dielectric layer of the layered substrate of FIG. 3.

On the twelfth dielectric layer 212 of FIG. 16 there is formed a grounding conductor layer 238. The conductor layer 221 of FIG. 5 is connected to the conductor layer 238 via through holes formed in the dielectric layers 201 to 211. The conductor layers 227, 229 to 231 of FIG. 6 are also connected to the conductor layer 238 via through holes formed in the dielectric layers 202 to 211. The conductor layer 235 of FIG. 7 is also connected to the conductor layer 238 via through holes formed in the dielectric layers 203 to 211. The conductor layer 583 of FIG. 13 is also connected to the conductor layer 238 via through holes formed in the dielectric layers 209 to 211. The conductor layer 238, together with the conductor layer 585 of FIG. 14, forms the capacitor 71 of FIG. 2. The conductor layer 238, together with the conductor layers 479, 587 and 588 of FIG. 15, forms the capacitors 41, 54 and 62 of FIG. 2, respectively.

The dielectric layer 212 has through holes h121 to h128 respectively connected to the through holes h111 to h118. The dielectric layer 212 has a number of through holes, as shown in FIG. 16, besides those indicated with numerals.

Figure 17:
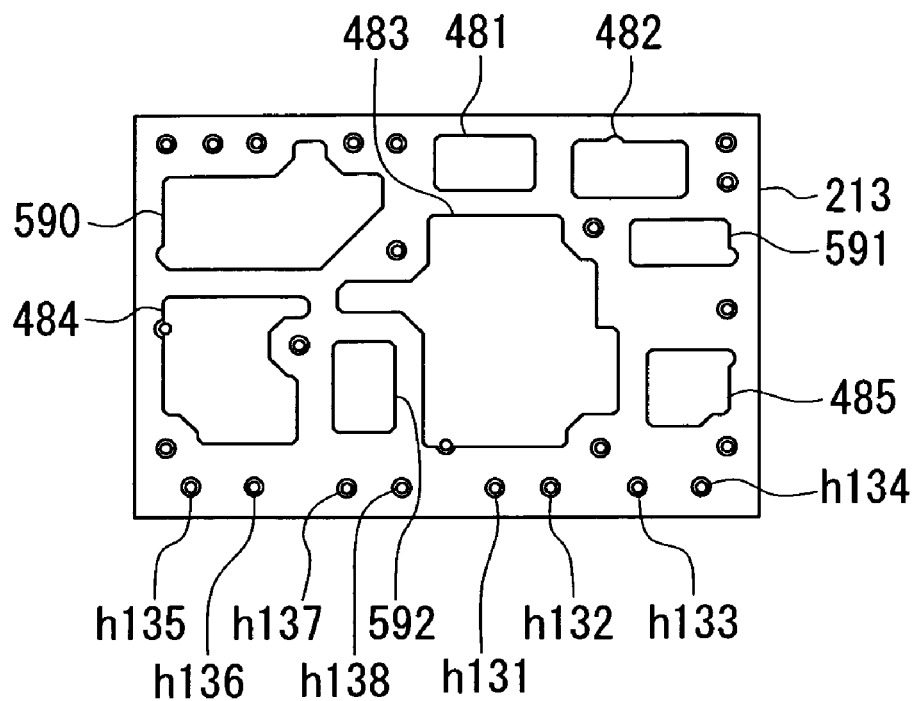
FIG. 17 is a top view illustrating the top surface of the thirteenth dielectric layer of the layered substrate of FIG. 3.

On the thirteenth dielectric layer 213 of FIG. 17 there are formed capacitor-forming conductor layers 481 to 485 and 590 to 592. The conductor layer 481 forms part of the capacitor 24 of FIG. 2. The conductor layer 477 of FIG. 15 is connected to the conductor layer 481 via through holes formed in the dielectric layers 211 and 212. The conductor layer 482 forms part of the capacitor 32 of FIG. 2. The conductor layer 478 of FIG. 15 is connected to the conductor layer 482 via through holes formed in the dielectric layers 211 and 212. The conductor layer 483 forms part of the capacitor 22 of FIG. 2. The conductor layer 427 of FIG. 6 is connected to the conductor layer 483 via through holes formed in the dielectric layers 202 to 212. The conductor layer 484 forms part of the capacitor 23 of FIG. 2. The conductor layer 428 of FIG. 6 is connected to the conductor layer 484 via through holes formed in the dielectric layers 202 to 212. The conductor layer 485 forms part of the capacitor 44 of FIG. 2. The conductor layer 443 of FIG. 8 is connected to the conductor layer 485 via through holes formed in the dielectric layers 204 to 212.

The conductor layer 590 forms part of the capacitor 52 of FIG. 2. The conductor layer 526 of FIG. 6 is connected to the conductor layer 590 via through holes formed in the dielectric layers 202 to 212. The conductor layer 591 forms part of the capacitor 64 of FIG. 2. The conductor layer 580 of FIG. 13 is connected to the conductor layer 591 via through holes formed in the dielectric layers 209 to 212. The conductor layer 592 forms part of the capacitor 74 of FIG. 2. The conductor layer 547 of FIG. 8 is connected to the conductor layer 592 via through holes formed in the dielectric layers 204 to 212.

The dielectric layer 213 has through holes h131 to h138 respectively connected to the through holes h121 to h128. The dielectric layer 213 has a number of through holes, as shown in FIG. 17, besides those indicated with numerals.

Figure 18:
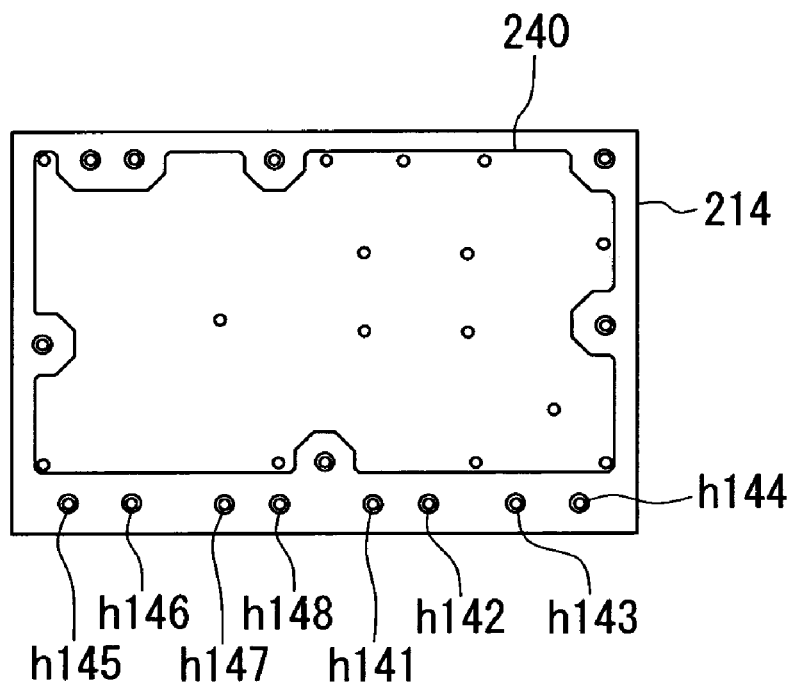
FIG. 18 is a top view illustrating the top surface of the fourteenth dielectric layer of the layered substrate of FIG. 3.

On the fourteenth dielectric layer 214 of FIG. 18 there is formed a grounding conductor layer 240. The conductor layer 238 of FIG. 16 is connected to the conductor layer 240 via through holes formed in the dielectric layers 212 and 213. The capacitor 24 of FIG. 2 is composed of the conductor layers 477, 238, 481 and 240. The capacitor 32 of FIG. 2 is composed of the conductor layers 478, 238, 482 and 240. The capacitor 44 of FIG. 2 is composed of the conductor layers 238, 485 and 240. The capacitor 52 of FIG. 2 is composed of the conductor layers 238, 590 and 240. The capacitor 62 of FIG. 2 is composed of the conductor layers 238, 588 and 240. The capacitor 74 of FIG. 2 is composed of the conductor layers 238, 592 and 240.

The dielectric layer 214 has through holes h141 to h148 respectively connected to the through holes h131 to h138. The dielectric layer 214 has a number of through holes, as shown in FIG. 18, besides those indicated with numerals.

Figure 19:
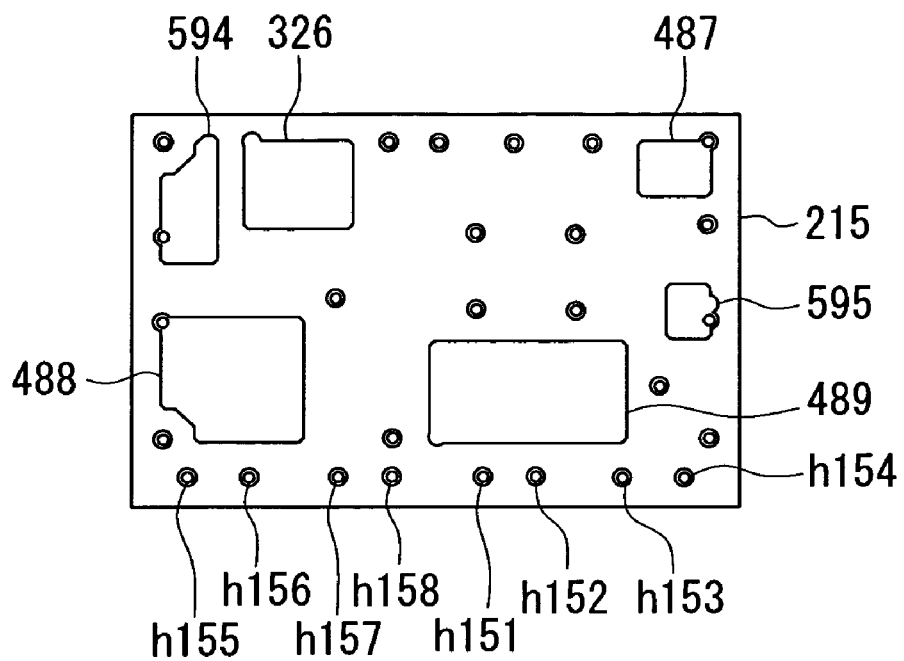
FIG. 19 is a top view illustrating the top surface of the fifteenth dielectric layer of the layered substrate of FIG. 3.

On the fifteenth dielectric layer 215 of FIG. 19 there are formed capacitor-forming conductor layers 326, 487, 488, 489, 594 and 595. The conductor layer 326 forms part of the capacitor 16 of FIG. 2. The conductor layer 319 of FIG. 11 is connected to the conductor layer 326 via through holes formed in the dielectric layers 207 to 214.

The conductor layer 487 forms part of the capacitor 34 of FIG. 2. The conductor layer 473 of FIG. 13 is connected to the conductor layer 487 via through holes formed in the dielectric layers 209 to 214. The conductor layer 488 forms part of the capacitor 23 of FIG. 2. The conductor layer 484 of FIG. 17 is connected to the conductor layer 488 via through holes formed in the dielectric layers 213 and 214. The conductor layer 489 forms part of the capacitor 22 of FIG. 2. The conductor layer 483 of FIG. 17 is connected to the conductor layer 489 via through holes formed in the dielectric layers 213 and 214. The conductor layer 594 forms part of the capacitor 53 of FIG. 2. The conductor layer 511 of FIG. 5 is connected to the conductor layer 594 via through holes formed in the dielectric layers 201 to 214. The conductor layer 595 forms part of the capacitor 67 of FIG. 2. The conductor layer 575 of FIG. 12 is connected to the conductor layer 595 via through holes formed in the dielectric layers 208 to 214.

The dielectric layer 215 has through holes h151 to h158 respectively connected to the through holes h141 to h148. The dielectric layer 215 has a number of through holes, as shown in FIG. 19, besides those indicated with numerals.

Figure 20:
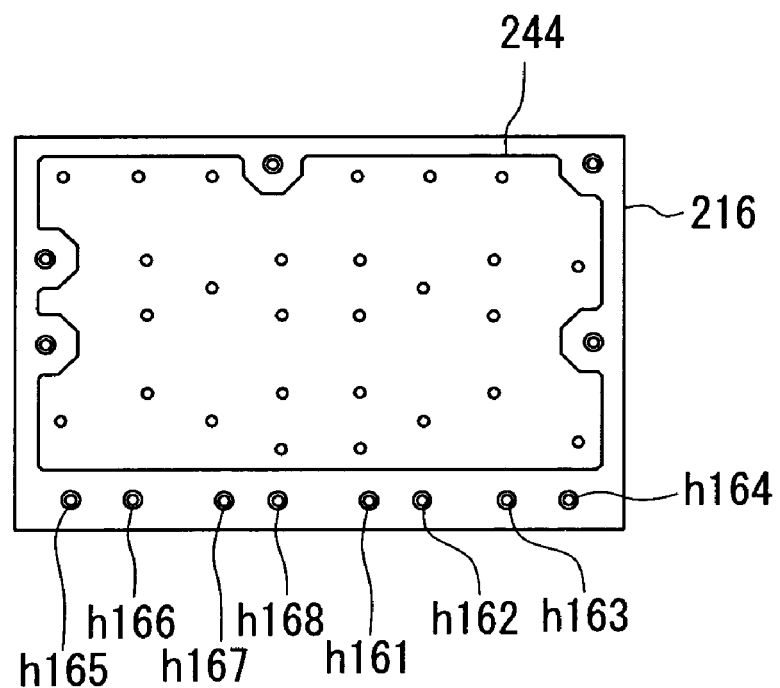
FIG. 20 is a top view illustrating the top surface of the sixteenth dielectric layer of the layered substrate of FIG. 3.
Figure 21:
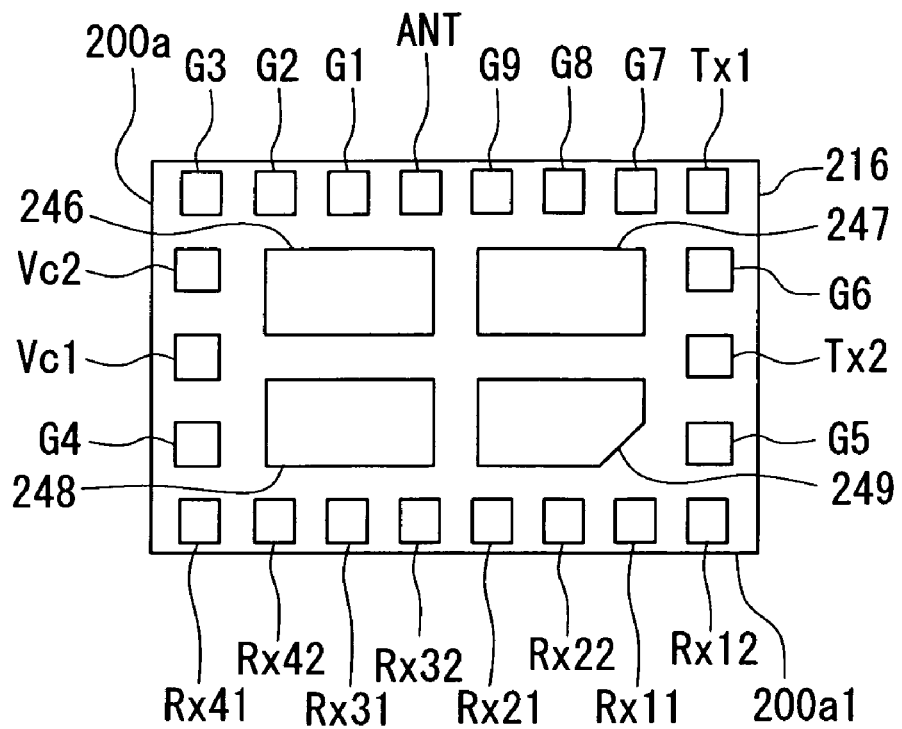
FIG. 21 is a top view illustrating the sixteenth dielectric layer and a conductor layer therebelow of the layered substrate of FIG. 3.

On the sixteenth dielectric layer 216 of FIG. 20 there is formed a grounding conductor layer 244. The conductor layer 240 of FIG. 18 is connected to the conductor layer 244 via through holes formed in the dielectric layers 214 and 215.

The capacitor 16 of FIG. 2 is composed of the conductor layers 240, 326 and 244. The capacitor 22 of FIG. 2 is composed of the conductor layers 238, 483, 240, 489 and 244. The capacitor 23 of FIG. 2 is composed of the conductor layers 238, 484, 240, 488 and 244. The capacitor 34 of FIG. 2 is composed of the conductor layers 240, 487 and 244. The capacitor 53 of FIG. 2 is composed of the conductor layers 240, 594 and 244. The capacitor 67 of FIG. 2 is composed of the conductor layers 240, 595 and 244.

The dielectric layer 216 has through holes h161 to h168 respectively connected to the through holes h151 to h158. The dielectric layer 216 has a number of through holes, as shown in FIG. 20, besides those indicated with numerals.

As shown in FIG. 21, on the undersurface of the dielectric layer 216, that is, on the bottom surface 200a of the layered substrate 200, there are formed conductor layers that form the terminals ANT, Rx11, Rx12, Rx21, Rx22, Rx31, Rx32, Rx41, Rx42, Tx1, Tx2, Vc1 and Vc2, conductor layers that form nine ground terminals G1 to G9, and grounding conductor layers 246 to 249. The ground terminals G1 to G9 are adapted to be connected to the ground.

The bottom surface 200a of the layered substrate 200 has four sides. On the bottom surface 200a the plurality of terminals listed above are disposed next to each other near the four sides. All the reception signal terminals Rx11, Rx12, Rx21, Rx22, Rx31, Rx32, Rx41 and Rx42 are disposed near a side 200a1 among the four sides.

The conductor layer 322 of FIG. 13 is connected to the antenna terminal ANT via through holes formed in the dielectric layers 209 to 216. The conductor layer 487 of FIG. 19 is connected to the transmission signal terminal Tx1 via through holes formed in the dielectric layers 215 and 216. The conductor layer 595 of FIG. 19 is connected to the transmission signal terminal Tx2 via through holes formed in the dielectric layers 215 and 216. The conductor layer 484 of FIG. 17 is connected to the control terminal Vc1 via through holes formed in the dielectric layers 213 to 216. The conductor layer 594 of FIG. 19 is connected to the control terminal Vc2 via through holes formed in the dielectric layers 215 and 216. The conductor layer 244 of FIG. 20 is connected to the ground terminals G1 to G9 and the conductor layers 246 to 249 via through holes formed in the dielectric layer 216.

The conductor layer 409 of FIG. 5 is connected to the AGSM reception signal terminal Rx11 via a signal path (hereinafter referred to as signal path SP11) composed of the through hole h13, the conductor layer a23, the though holes h23, h33 and h43, the conductor layer a53, the through holes h53, h63, h73 and h83, the conductor layer a93, and the through holes h93, h103, h113, h123, h133, h143, h153 and h163. The terminal P12 of the dual SAW filter 121 is connected to the conductor layer 409. Consequently, the signal path SP11 connects the terminal P12 and the AGSM reception signal terminal Rx11 to each other. The signal path SP11 corresponds to the first signal path of the present invention.

The conductor layer 410 of FIG. 5 is connected to the AGSM reception signal terminal Rx12 via a signal path (hereinafter referred to as signal path SP12) composed of the through hole h14, the conductor layer a24, the though holes h24, h34 and h44, the conductor layer a54, the through holes h54, h64, h74 and h84, the conductor layer a94, and the through holes h94, h104, h114, h124, h134, h144, h154 and h164. The terminal P13 of the dual SAW filter 121 is connected to the conductor layer 410. Consequently, the signal path SP12 connects the terminal P13 and the AGSM reception signal terminal Rx12 to each other. The signal path SP12 corresponds to the second signal path of the present invention.

The conductor layer 407 of FIG. 5 is connected to the EGSM reception signal terminal Rx21 via a signal path (hereinafter referred to as signal path SP21) composed of the through hole h11, the conductor layer a21, the though holes h21, h31, h41, h51 and h61, the conductor layer a71, and the through holes h71, h81, h91, h101, h111, h121, h131, h141, h151 and h161. The terminal P15 of the dual SAW filter 121 is connected to the conductor layer 407. Consequently, the signal path SP21 connects the terminal P15 and the EGSM reception signal terminal Rx21 to each other. The signal path SP21 corresponds to the first signal path of the present invention.

The conductor layer 408 of FIG. 5 is connected to the EGSM reception signal terminal Rx22 via a signal path (hereinafter referred to as signal path SP22) composed of the through hole h12, the conductor layer a22, the though holes h22, h32, h42, h52 and h62, the conductor layer a72, and the through holes h72, h82, h92, h102, h112, h122, h132, h142, h152 and h162. The terminal P16 of the dual SAW filter 121 is connected to the conductor layer 408. Consequently, the signal path SP22 connects the terminal P16 and the EGSM reception signal terminal Rx22 to each other. The signal path SP22 corresponds to the second signal path of the present invention.

The conductor layer 509 of FIG. 5 is connected to the DCS reception signal terminal Rx31 via a signal path (hereinafter referred to as signal path SP31) composed of the through hole h17, the conductor layer a27, the though holes h27, h37, h47, h57 and h67, the conductor layer a77, and the through holes h77, h87, h97, h107, h117, h127, h137, h147, h157 and h167. The terminal P22 of the dual SAW filter 122 is connected to the conductor layer 509. Consequently, the signal path SP31 connects the terminal P22 and the DCS reception signal terminal Rx31 to each other. The signal path SP31 corresponds to the first signal path of the present invention.

The conductor layer 510 of FIG. 5 is connected to the DCS reception signal terminal Rx32 via a signal path (hereinafter referred to as signal path SP32) composed of the through hole h18, the conductor layer a28, the though holes h28, h38, h48, h58 and h68, the conductor layer a78, and the through holes h78, h88, h98, h108, h118, h128, h138, h148, h158 and h168. The terminal P23 of the dual SAW filter 122 is connected to the conductor layer 510. Consequently, the signal path SP32 connects the terminal P23 and the DCS reception signal terminal Rx32 to each other. The signal path SP32 corresponds to the second signal path of the present invention.

The conductor layer 507 of FIG. 5 is connected to the PCS reception signal terminal Rx41 via a signal path (hereinafter referred to as signal path SP41) composed of the through hole h15, the conductor layer a25, the though holes h25, h35 and h45, the conductor layer a55, the through holes h55, h65, h75 and h85, the conductor layer a95, and the through holes h95, h105, h115, h125, h135, h145, h155 and h165. The terminal P25 of the dual SAW filter 122 is connected to the conductor layer 507. Consequently, the signal path SP41 connects the terminal P25 and the PCS reception signal terminal Rx41 to each other. The signal path SP41 corresponds to the first signal path of the present invention.

The conductor layer 508 of FIG. 5 is connected to the PCS reception signal terminal Rx42 via a signal path (hereinafter referred to as signal path SP42) composed of the through hole h16, the conductor layer a26, the though holes h26, h36 and h46, the conductor layer a56, the through holes h56, h66, h76 and h86, the conductor layer a96, and the through holes h96, h106, h116, h126, h136, h146, h156 and h166. The terminal P26 of the dual SAW filter 122 is connected to the conductor layer 508. Consequently, the signal path SP42 connects the terminal P26 and the PCS reception signal terminal Rx42 to each other. The signal path SP42 corresponds to the second signal path of the present invention.

The features of the high frequency module 1 of the embodiment will now be described. In the following, for simplifying the description, the reception signal terminals Rx11, Rx21, Rx31 and Rx41 are referred to as a first reception signal terminal Rx1, the reception signal terminals Rx12, Rx22, Rx32 and Rx42 are referred to as a second reception signal terminal Rx2, and the transmission signal terminals Tx1 and Tx2 are referred to as a transmission signal terminal Tx. A circuit composed of the diplexer 10 and the switch circuits 20 and 50 is referred to as a separation circuit. The dual SAW filters 121 and 122 are referred to as a balanced signal output element 120. The terminals P12, P15, P22 and P25 are referred to as a first output terminal T1, and the terminals P13, P16, P23 and P26 are referred to as a second output terminal T2. The signal paths SP11, SP21, SP31 and SP41 are referred to as a first signal path SP1, and the signal paths P12, P22, P32 and P42 are referred to as a second signal path SP2.

The high frequency module 1 of the embodiment includes: the antenna terminal ANT connected to the antenna 101; the first and second reception signal terminals Rx1 and Rx2 for outputting a reception signal in a balanced state; the transmission signal terminal Tx for receiving a transmission signal; the separation circuit disposed between the antenna terminal ANT and the first and second reception and transmission signal terminals Rx1, Rx2 and Tx and separating the transmission signal and the reception signal from each other; the balanced signal output element 120 provided between the separation circuit and the first and second reception signal terminals Rx1 and Rx2 and outputting the reception signal in a balanced state; and the layered substrate 200 for integrating the foregoing components.

The layered substrate 200 includes a plurality of dielectric layers stacked, and has the bottom surface 200a and the top surface 200b located on opposite sides in the direction in which the dielectric layers are stacked, and a plurality of side surfaces coupling the bottom surface 200a and the top surface 200b to each other. The balanced signal output element 120 has the first and second output terminals T1 and T2 for outputting the reception signal in a balanced state, and is mounted on the top surface 200b of the layered substrate 200. As shown in FIG. 21, the bottom surface 200a of the layered substrate 200 has a plurality of sides including the side 200a1 closest to the first and second reception signal terminals Rx1 and Rx2. As is clear from FIG. 5 and FIG. 21, as seen from above the layered substrate 200 the first output terminal T1 (P12, P15, P22 and P25) and the second output terminal T2 (P13, P16, P23 and P26) of the balanced signal output element 120 are located closest to the side 200a1 of the plurality of sides of the bottom surface 200a of the layered substrate 200, the side 200a1 being closest to the first and second reception signal terminals Rx1 and Rx2.

The high frequency module 1 further includes the first signal path SP1 connecting the first output terminal T1 and the first reception signal terminal Rx1 to each other, and the second signal path SP2 connecting the second output terminal T2 and the second reception signal terminal Rx2 to each other. The first and second signal paths SP1 and SP2 are each formed using one or more through holes provided inside the layered substrate 200, and are not exposed at any side surface of the layered substrate 200.

Furthermore, in the embodiment, each of the first and second signal paths SP1 and SP2 includes two through holes disposed such that their respective central axes are offset from each other, and position-adjusting conductor layers provided inside the layered substrate 200 and connecting the two through holes in series. Specifically, the position-adjusting conductor layers are the conductor layers a21 to a28 of FIG. 6, the conductor layers a53 to a56 of FIG. 9, the conductor layers a71, a72, a77 and a78 of FIG. 11, and the conductor layers a93 to a96 of FIG. 13. The position-adjusting conductor layers connect two through holes that are disposed such that their respective central axes are offset from each other, and thereby allow the positions of those through holes to be adjustable. In the embodiment, the first signal path SP1 and the second signal path SP2 are equal in length.

Figure 22:
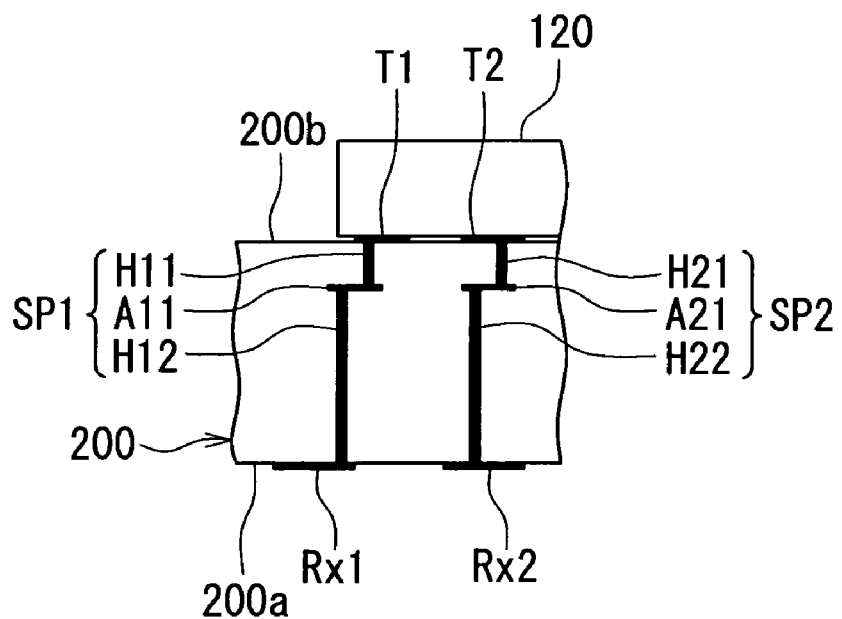
FIG. 22 is a cross-sectional view illustrating a first example of forms of a first signal path and a second signal path of the embodiment of the invention.
Figure 23:
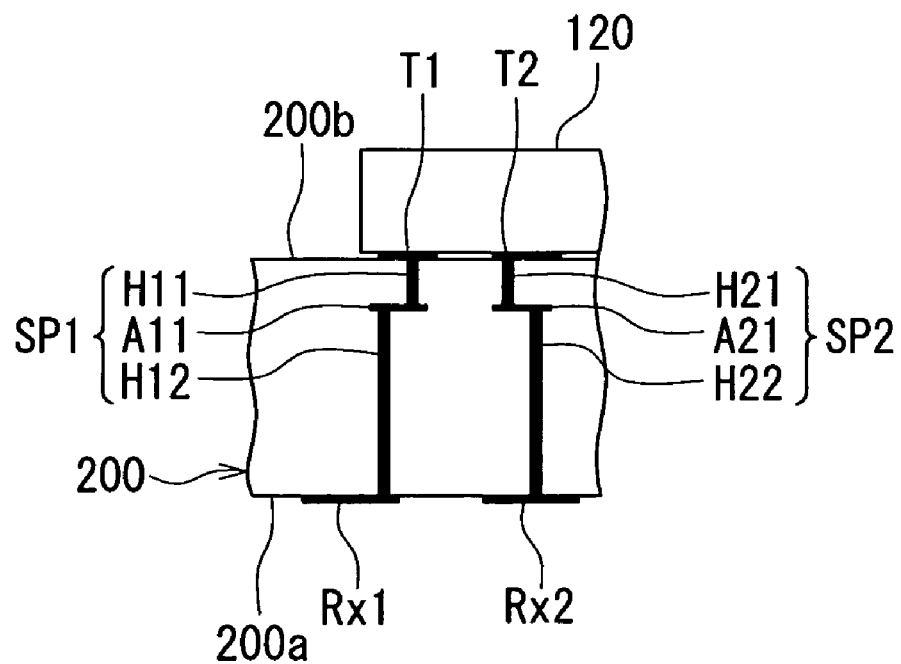
FIG. 23 is a cross-sectional view illustrating a second example of forms of the first signal path and the second signal path of the embodiment of the invention.
Figure 24:
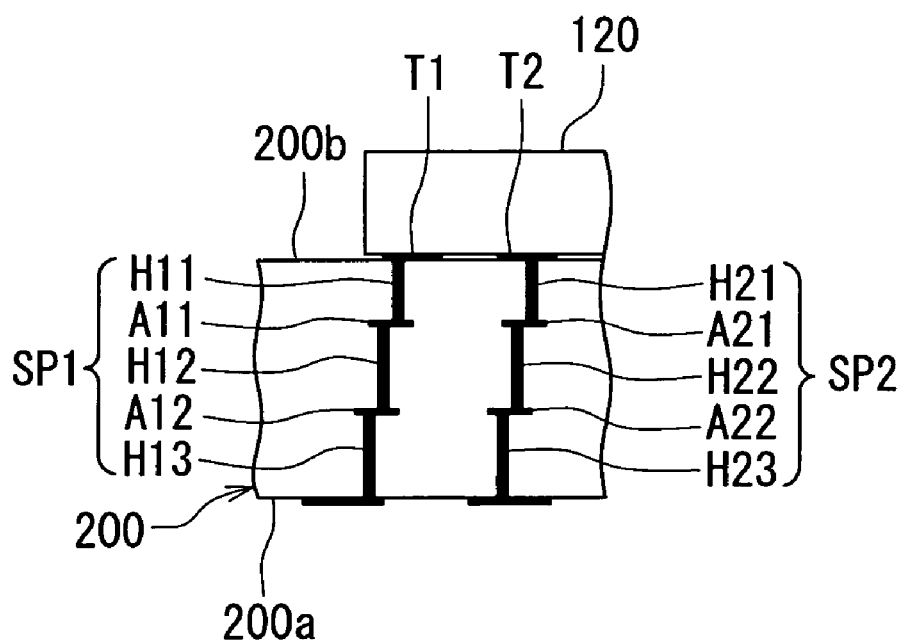
FIG. 24 is a cross-sectional view illustrating a third example of forms of the first signal path and the second signal path of the embodiment of the invention.

A first to a third example of forms of the signal paths SP1 and SP2 are illustrated in FIG. 22 to FIG. 24, respectively. Each of FIG. 22 to FIG. 24 is a cross-sectional view schematically illustrating the signal paths SP1 and SP2. In each of the first to third examples, the first reception signal terminal Rx1 and the second reception signal terminal Rx2 are located such that they do not overlap the first output terminal T1 and the second output terminal T2, respectively, as seen from above the layered substrate 200. Furthermore, in each of the first to third examples, the distance between the first and second reception signal terminals Rx1 and Rx2 is different from the distance between the first and second output terminals T1 and T2.

In each of the first example shown in FIG. 22 and the second example shown in FIG. 23, the signal path SP1 is composed of through hole lines H11 and H12 each made up of a plurality of through holes connected in series, and a position-adjusting conductor layer A11 connecting the through hole lines H11 and H12 in series. An end of the through hole line H11 is connected to the first output terminal T1, while the other end of the through hole line H11 is connected to the top surface of the position-adjusting conductor layer A11. An end of the through hole line H12 is connected to the undersurface of the position-adjusting conductor layer A11, while the other end of the through hole line H12 is connected to the first reception signal terminal Rx1. The through hole lines H11 and H12 are disposed such that their respective central axes are offset from each other.

Likewise, the signal path SP2 is composed of through hole lines H21 and H22 each made up of a plurality of through holes connected in series, and a position-adjusting conductor layer A21 connecting the through hole lines H21 and H22 in series. An end of the through hole line H21 is connected to the second output terminal T2, while the other end of the through hole line H21 is connected to the top surface of the position-adjusting conductor layer A21. An end of the through hole line H22 is connected to the undersurface of the position-adjusting conductor layer A21, while the other end of the through hole line H22 is connected to the second reception signal terminal Rx2. The through hole lines H21 and H22 are disposed such that their respective central axes are offset from each other.

In each of the first and second examples, the total length of the through hole lines H11 and H12 is equal to the total length of the through hole lines H21 and H22. In addition, the length of the portion of the conductor layer A11 from the point connected to the through hole line H11 to the point connected to the through hole line H12 is equal to the length of the portion of the conductor layer A21 from the point connected to the through hole line H21 to the point connected to the through hole line H22. Therefore, the length of the first signal path SP1 and the length of the second signal path SP2 are equal.

In the third example shown in FIG. 24, the signal path SP1 is composed of through hole lines H11, H12 and H13 each made up of a plurality of through holes connected in series, a position-adjusting conductor layer A11 connecting the through hole lines H11 and H12 in series, and a position-adjusting conductor layer A12 connecting the through hole lines H12 and H13 in series. An end of the through hole line H11 is connected to the first output terminal T1, while the other end of the through hole line H11 is connected to the top surface of the position-adjusting conductor layer A11. An end of the through hole line H12 is connected to the undersurface of the position-adjusting conductor layer A11, while the other end of the through hole line H12 is connected to the top surface of the position-adjusting conductor layer A12. An end of the through hole line H13 is connected to the undersurface of the position-adjusting conductor layer A12, while the other end of the through hole line H13 is connected to the first reception signal terminal Rx1. The through hole lines H11, H12 and H13 are disposed such that their respective central axes are offset from each other.

Likewise, the signal path SP2 is composed of through hole lines H21, H22 and H23 each made up of a plurality of through holes connected in series, a position-adjusting conductor layer A21 connecting the through hole lines H21 and H22 in series, and a position-adjusting conductor layer A22 connecting the through hole lines H22 and H23 in series. An end of the through hole line H21 is connected to the second output terminal T2, while the other end of the through hole line H21 is connected to the top surface of the position-adjusting conductor layer A21. An end of the through hole line H22 is connected to the undersurface of the position-adjusting conductor layer A21, while the other end of the through hole line H22 is connected to the top surface of the position-adjusting conductor layer A22. An end of the through hole line H23 is connected to the undersurface of the position-adjusting conductor layer A22, while the other end of the through hole line H23 is connected to the second reception signal terminal Rx2.

In the third example, the total length of the through hole lines H11, H12 and H13 is equal to the total length of the through hole lines H21, H22 and H23. In addition, the length of the portion of the conductor layer A11 from the point connected to the through hole line H11 to the point connected to the through hole line H12 is equal to the length of the portion of the conductor layer A21 from the point connected to the through hole line H21 to the point connected to the through hole line H22. Furthermore, the length of the portion of the conductor layer A12 from the point connected to the through hole line H12 to the point connected to the through hole line H13 is equal to the length of the portion of the conductor layer A22 from the point connected to the through hole line H22 to the point connected to the through hole line H23. Therefore, the length of the first signal path SP1 and the length of the second signal path SP2 are equal.

According to the high frequency module 1 of the embodiment, it is possible to minimize the lengths of the first and second signal paths SP1 and SP2 that connect the first and second output terminals T1 and T2 of the balanced signal output element 120 disposed on the top surface 200b of the layered substrate 200 to the first and second reception signal terminals Rx1 and Rx2 disposed on the bottom surface 200a of the layered substrate 200. As a result, according to the embodiment, it is possible to reduce insertion loss of the path of the reception signal and to downsize the high frequency module 1. Furthermore, according to the embodiment, since each of the first and second signal paths SP1 and SP2 is not exposed at any side surface of the layered substrate 200, the signal paths SP1 and SP2 are impervious to interference from a circuit outside the module 1.

If it is possible to dispose the first and second reception signal terminals Rx1 and Rx2 at such positions that they respectively overlap the first and second output terminals T1 and T2 as seen from above the layered substrate 200, it becomes possible to construct each of the first and second signal paths SP1 and SP2 of a single through hole line and to thereby minimize the lengths of the first and second signal paths SP1 and SP2. In actuality, however, it is not always possible to provide such a layout, and there are cases where it is inevitable to dispose the first and second reception signal terminals Rx1 and Rx2 at such positions that they do not respectively overlap the first and second output terminals T1 and T2 as seen from above the layered substrate 200, or cases where the distance between the first and second reception signal terminals Rx1 and Rx2 is different from the distance between the first and second output terminals T1 and T2. Such cases noticeably arise when a plurality of balanced signal output elements 120 are mounted on the top surface 200b of the layered substrate 200. In such cases, a reduction in balance of the balanced signal may result if the lengths of the first and second signal paths SP1 and SP2 are different from each other.

According to the embodiment, each of the first and second signal paths SP1 and SP2 includes two through holes disposed such that their respective central axes are offset from each other and a position-adjusting conductor layer connecting the two through holes in series, and the first and second signal paths SP1 and SP2 are equal in length. Consequently, according to the embodiment, it is possible that the lengths of the first and second signal paths SP1 and SP2 are equal even in the case where the first and second reception signal terminals Rx1 and Rx2 are disposed at such positions that they do not respectively overlap the first and second output terminals T1 and T2 as seen from above the layered substrate 200, or in the case where the distance between the first and second reception signal terminals Rx1 and Rx2 is different from the distance between the first and second output terminals T1 and T2.

Figure 25:
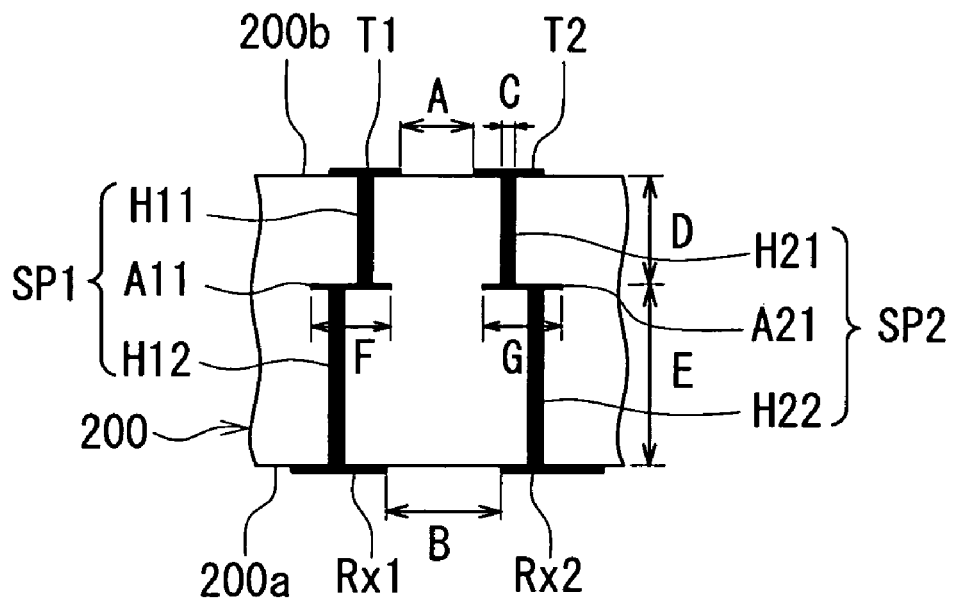
FIG. 25 is a cross-sectional view illustrating the configuration of a model used in a first simulation.
Figure 26:
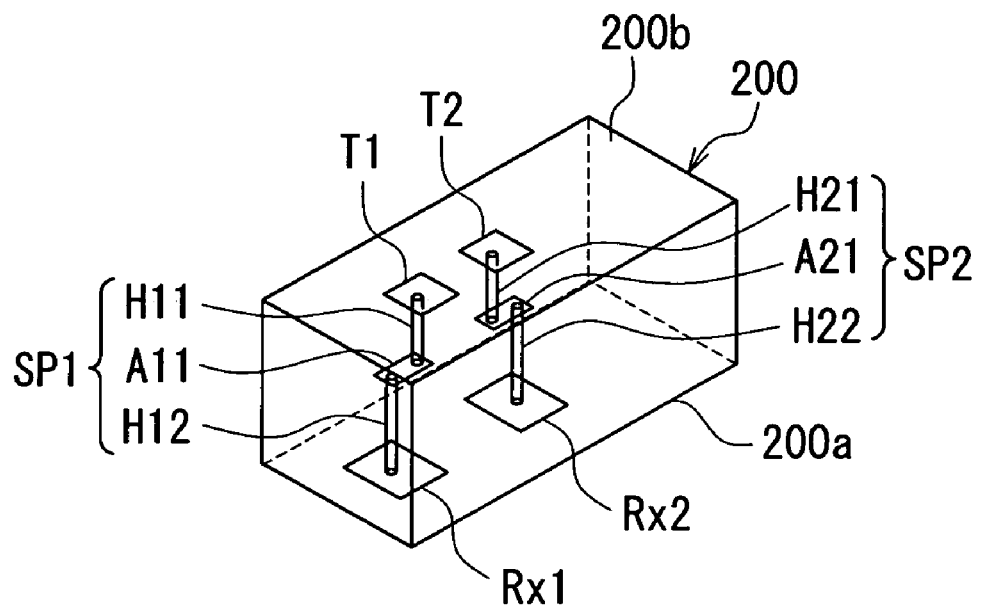
FIG. 26 is a perspective view illustrating the configuration of the model used in the first simulation.

By making the lengths of the first and second signal paths SP1 and SP2 equal as described above, it is possible to increase the balance of the balanced signal outputted from the reception signal terminals Rx1 and Rx2. This was shown from the results of a first simulation, which will now be described with reference to FIG. 25 to FIG. 27. FIG. 25 is a cross-sectional view illustrating the configuration of a model used in the first simulation. FIG. 26 is a perspective view illustrating the configuration of the model used in the first simulation. In this model, as in the example shown in FIG. 23, the signal path SP1 is composed of the through hole lines H11 and H12 and the position-adjusting conductor layer A11, while the signal path SP2 is composed of the through hole lines H21 and H22 and the position-adjusting conductor layer A21. Here, the distance between the output terminals T1 and T2 is represented by "A", the distance between the reception signal terminals Rx1 and Rx2 is represented by "B", and the diameter of each of the through holes constituting the through hole lines H11, H12, H21 and H22 is represented by "C". In addition, the length of each of the through hole lines H11 and H21 is represented by "D", and the length of each of the through hole lines H12 and H22 is represented by "E". The top surface of each of the position-adjusting conductor layers A11 and A21 is in the shape of a rectangle that is long in one direction. The longitudinal length of the position-adjusting conductor layer A11 is represented by "F", while the longitudinal length of the position-adjusting conductor layer A21 is represented by "G". The distance "A" and the distance "B" are different.

In the first simulation, the length "F" was fixed to 0.25 mm while the length "G" was varied among four different values of 0.25 mm, 0.45 mm, 0.65 mm and 0.85 mm, and the frequency response of the amplitude difference between output signals from the reception signal terminals Rx1 and Rx2 was determined for each case. When the length "F" is 0.25 mm, the length of the portion of the conductor layer A11 from the point connected to the through hole line H11 to the point connected to the through hole line H12 is 0.15 mm. When the length "G" is 0.25 mm, 0.45 mm, 0.65 mm, and 0.85 mm, the length of the portion of the conductor layer A21 from the point connected to the through hole line H21 to the point connected to the through hole line H22 is 0.15 mm, 0.35 mm, 0.55 mm, and 0.75 mm, respectively.

Figure 27:
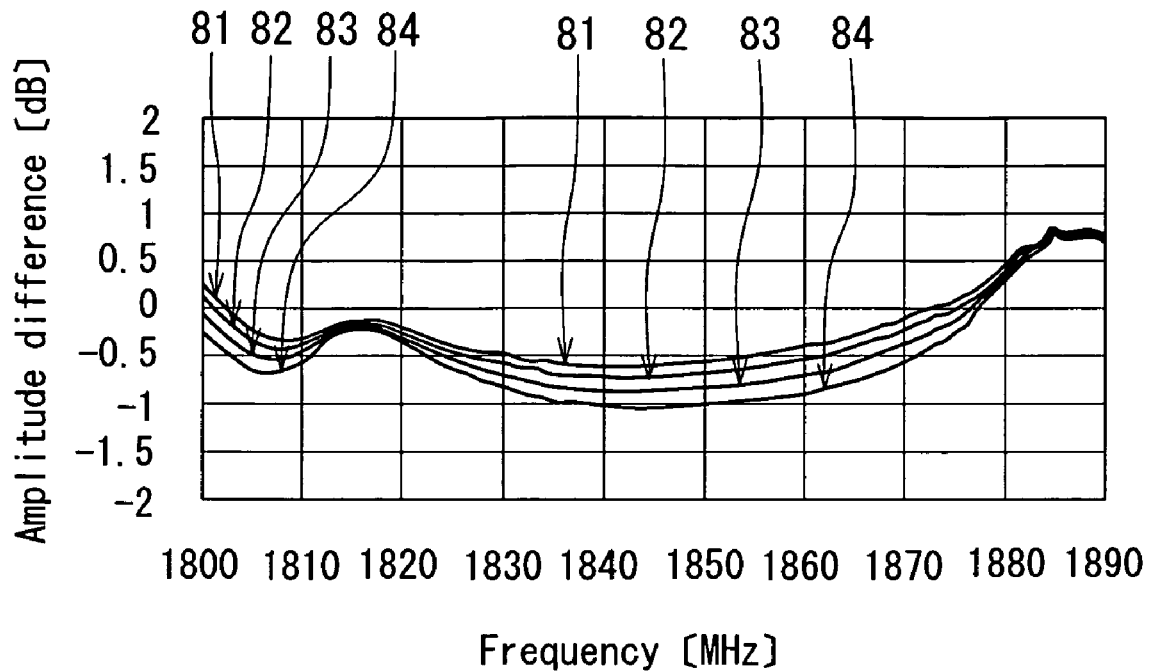
FIG. 27 is a plot illustrating the results of the first simulation.

The results of the first simulation are shown in FIG. 27. In FIG. 27 the curves marked with numerals 81, 82, 83 and 84 indicate the frequency responses of the amplitude difference for the cases where the length "G" is 0.25 mm, 0.45 mm, 0.65 mm and 0.85 mm, respectively. FIG. 27 indicates that the smaller the difference between the lengths "F" and "G", the smaller the amplitude difference, that is, the higher the balance.

Figure 28:
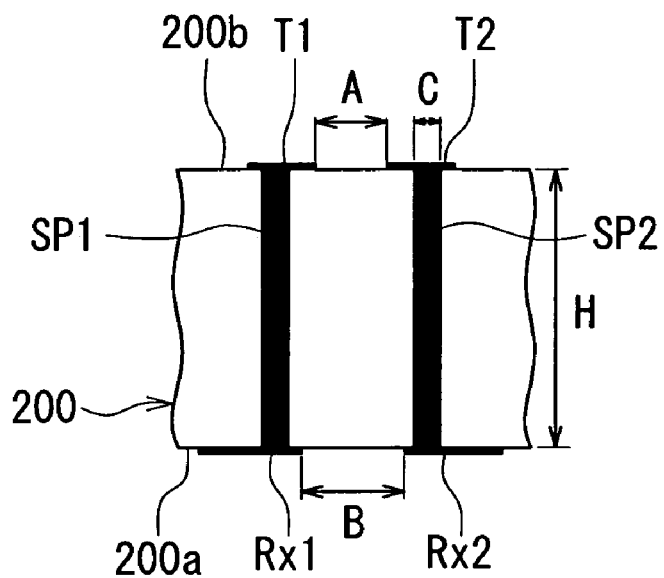
FIG. 28 is a cross-sectional view illustrating the configuration of a model used in a second simulation.
Figure 29:
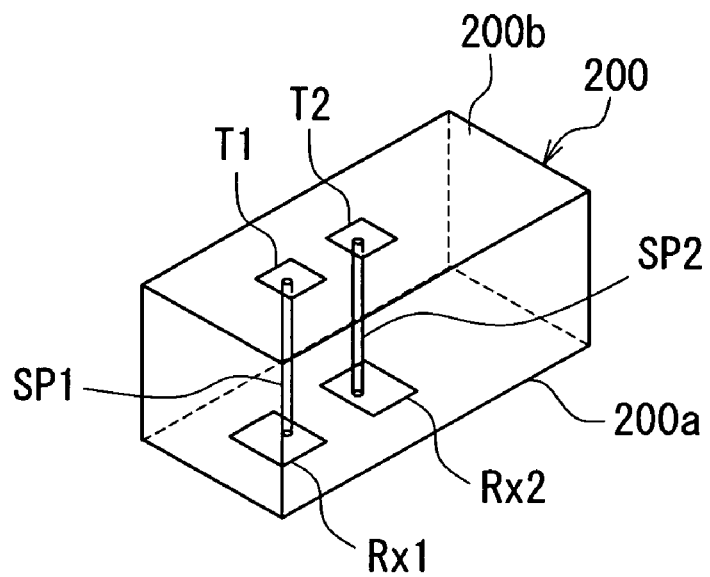
FIG. 29 is a perspective view illustrating the configuration of the model used in the second simulation.

In the embodiment, the through holes used to form the first and second signal paths SP1 and SP2 may be greater in diameter than the other through holes included in the layered substrate 200. In this case, it is possible to reduce the insertion loss of the first and second signal paths SP1 and SP2. This was shown from the results of a second simulation, which will now be described with reference to FIG. 28 to FIG. 30. FIG. 28 is a cross-sectional view illustrating the configuration of a model used in the second simulation. FIG. 29 is a perspective view illustrating the configuration of the model used in the second simulation. In this model, each of the signal paths SP1 and SP2 is composed only of a single through hole line made up of a plurality of through holes connected in series. Here, the distance between the output terminals T1 and T2 is represented by "A", the distance between the reception signal terminals Rx1 and Rx2 is represented by "B", the diameter of each of the through holes constituting the signal paths SP1 and SP2 is represented by "C", and the length of each of the signal paths SP1 and SP2 is represented by "H".

Figure 30:
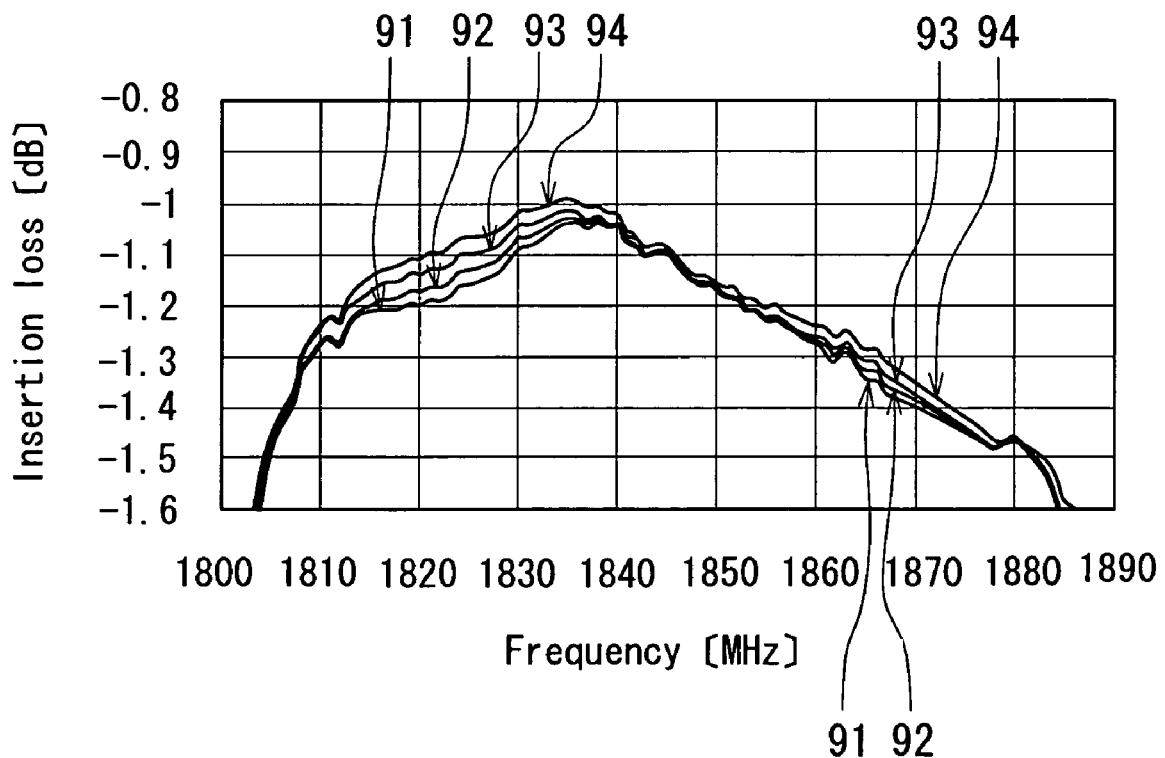
FIG. 30 is a plot illustrating the results of the second simulation.

In the second simulation, the distances "A" and "B" and the length "H" were fixed while the diameter "C" was varied among four different values of 0.05 mm, 0.10 mm, 0.15 mm and 0.20 mm, and the frequency response of the insertion loss of the signal paths SP1 and SP2 was determined for each case. The results of the second simulation are shown in FIG. 30. In FIG. 30 the curves marked with numerals 91, 92, 93 and 94 indicate the frequency responses of the insertion loss for the cases where the diameter "C" is 0.05 mm, 0.10 mm, 0.15 mm and 0.20 mm, respectively. FIG. 30 indicates that the greater the diameter "C", the smaller the insertion loss.

According to the embodiment, the high frequency module 1 includes: a plurality of sets of the first and second reception and transmission signal terminals Rx1, Rx2 and Tx corresponding to a plurality of pairs of transmission and reception signals in a plurality of different frequency bands; a plurality of balanced signal output elements 120 (121, 122) corresponding to a plurality of sets of the first and second reception signal terminals Rx1 and Rx2; and a plurality of sets of the first and second signal paths SP1 and SP2 corresponding to the plurality of sets of the first and second reception signal terminals Rx1 and Rx2.

In other words, the high frequency module 1 of the embodiment includes a plurality of groups of components corresponding to a plurality of pairs of transmission and reception signals in a plurality of different frequency bands, each of the plurality of groups comprising the first and second reception signal terminals Rx1 and Rx2, the transmission signal terminal Tx, the balanced signal output element 120, and the first and second signal paths SP1 and SP2. The separation circuit (10, 20, 50) is disposed between the antenna terminal ANT and the first and second reception and transmission signal terminals Rx1, Rx2 and Tx of the plurality of groups, separates each pair of transmission and reception signals from the other pairs, and separates the transmission signal and the reception signal of each pair from each other.

In the embodiment, as illustrated in FIG. 21, the first and second reception signal terminals Rx1 (Rx11, Rx21, Rx31 and Rx41) and Rx2 (Rx12, Rx22, Rx32 and Rx42) of the plurality of groups are aligned in a row along the side 200a1 of the bottom surface 200a of the layered substrate 200, the side 200a1 being closest to the first and second reception signal terminals Rx1 and Rx2 among the plurality of sides of the bottom surface 200a. Along the side 200a1 the first and second reception signal terminals Rx1 and Rx2 of the plurality of groups are aligned in descending order of frequency band. Specifically, the first and second reception signal terminals Rx1 and Rx2 of the plurality of groups are aligned in the order of the PCS reception signal terminals Rx41 and Rx42, the DCS reception signal terminals Rx31 and Rx32, the EGSM reception signal terminals Rx21 and Rx22, and the AGSM reception signal terminals Rx11 and Rx12, from the left side of FIG. 21.

Furthermore, according to the embodiment, on the bottom surface 200a of the layered substrate 200 no other terminal is disposed on an extension of the row of the first and second reception signal terminals Rx1 and Rx2 of the plurality of groups. Furthermore, as illustrated in FIG. 5 to FIG. 21, inside the layered substrate 200 any conductor layer other than the conductor layers used to form the first and second signal paths SP1 and SP2 of the plurality of groups is not located in a cross section that passes through the row of the first and second reception signal terminals Rx1 and Rx2 of the plurality of groups and that is perpendicular to the bottom surface 200a of the layered substrate 200. These features of the embodiment make it possible to prevent the occurrence of parasitic capacitance between the signal paths SP1, SP2 and any conductor layer other than the conductor layers used to form the signal paths SP1 and SP2, and to prevent the signal paths SP1 and SP2 from suffering interference from signals other than the reception signals passing therethrough. Furthermore, the foregoing features of the embodiment allow an increase in diameter of the through holes used to form the signal paths SP1 and SP2.

The present invention is not limited to the foregoing embodiment but can be carried out in various modifications. For example, in the present invention each of the signal paths SP1 and SP2 may be composed only of a single through hole line, as illustrated in FIG. 28.

The present invention is applicable not only to high frequency modules that are used as front-end modules in cellular phones but to high frequency modules that perform processing of separating a transmission signal and a reception signal from each other in general.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A high frequency module comprising:
an antenna terminal connected to an antenna;
a first reception signal terminal and a second reception signal terminal for outputting a reception signal in a balanced state;
a transmission signal terminal for receiving a transmission signal;
a separation circuit disposed between the antenna terminal and the first and second reception and transmission signal terminals, and separating the transmission signal and the reception signal from each other;
a balanced signal output element provided between the separation circuit and the first and second reception signal terminals and outputting the reception signal in a balanced state; and
a layered substrate for integrating the foregoing components, wherein:
the layered substrate includes a plurality of dielectric layers stacked, and has a bottom surface and a top surface located on opposite sides in a direction in which the dielectric layers are stacked, and a plurality of side surfaces coupling the bottom surface and the top surface to each other;
the balanced signal output element has a first output terminal and a second output terminal for outputting the reception signal in a balanced state, and is mounted on the top surface of the layered substrate;
the bottom surface of the layered substrate has a plurality of sides including one closest to the first and second reception signal terminals; and
as seen from above the layered substrate, the first and second output terminals of the balanced signal output element are located closest to the one of the plurality of sides of the bottom surface of the layered substrate that is closest to the first and second reception signal terminals,
the high frequency module further comprising a first signal path connecting the first output terminal and the first reception signal terminal to each other, and a second signal path connecting the second output terminal and the second reception signal terminal to each other,
wherein each of the first and second signal paths is formed using one or more through holes provided inside the layered substrate, and is not exposed at any side surface of the layered substrate.

2. The high frequency module according to claim 1, wherein the balanced signal output element is a filter formed using an acoustic wave element.

3. The high frequency module according to claim 1, wherein each of the first and second signal paths includes two through holes disposed such that their respective central axes are offset from each other, and a position-adjusting conductor layer provided inside the layered substrate and connecting the two through holes in series, and the first and second signal paths are equal in length.

4. The high frequency module according to claim 3, wherein a first distance between the first and second reception signal terminals is different from a second distance between the first and second output terminals.

5. The high frequency module according to claim 1, wherein the layered substrate further includes at least one other through hole in addition to the through holes used to form the first and second signal paths, and each of the through holes used to form the first and second signal paths has a diameter greater than that of the at least one other through hole.

6. The high frequency module according to claim 1, comprising a plurality of groups of components corresponding to a plurality of pairs of transmission and reception signals in a plurality of different frequency bands, each of the plurality of groups comprising the first and second reception signal terminals, the transmission signal terminal, the balanced signal output element, and the first and second signal paths,
wherein the separation circuit is disposed between the antenna terminal and the first and second reception and transmission signal terminals of the plurality of groups, the separation circuit separates each pair of transmission and reception signals from the other pairs, and separates the transmission signal and the reception signal of each pair from each other.

7. The high frequency module according to claim 6, wherein the first and second reception signal terminals of the plurality of groups are aligned in a row along the one of the plurality of sides of the bottom surface of the layered substrate that is closest to the first and second reception signal terminals.

8. The high frequency module according to claim 7, wherein the first and second reception signal terminals of the plurality of groups are aligned in descending order of frequency band.

9. The high frequency module according to claim 7, wherein, on the bottom surface of the layered substrate, no other terminal is disposed on an extension of the row of the first and second reception signal terminals of the plurality of groups.

10. The high frequency module according to claim 7, wherein, inside the layered substrate, any conductor layer other than conductor layers used to form the first and second signal paths of the plurality of groups is not located in a cross section that passes through the row of the first and second reception signal terminals of the plurality of groups and that is perpendicular to the bottom surface of the layered substrate.

* * * * *